United States Patent
Wang et al.

(10) Patent No.: US 11,641,566 B2
(45) Date of Patent: May 2, 2023

(54) USER-EQUIPMENT-COORDINATION-SET REGROUPING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/963,623

(22) PCT Filed: Jul. 25, 2019

(86) PCT No.: PCT/US2019/043355
§ 371 (c)(1),
(2) Date: Jul. 21, 2020

(87) PCT Pub. No.: WO2021/015774
PCT Pub. Date: Jan. 28, 2021

(65) Prior Publication Data
US 2021/0029516 A1    Jan. 28, 2021

(51) Int. Cl.
*H04W 4/08*    (2009.01)
*H04B 7/26*    (2006.01)

(52) U.S. Cl.
CPC ............ *H04W 4/08* (2013.01); *H04B 7/2643* (2013.01)

(58) Field of Classification Search
None
See application file for complete search history.

(56) References Cited

U.S. PATENT DOCUMENTS

| 6,665,521 B1 | 12/2003 | Gorday et al. |
| 6,898,430 B1 | 5/2005 | Liberti et al. |

(Continued)

FOREIGN PATENT DOCUMENTS

| CN | 101764634 | 6/2010 |
| CN | 101867451 | 10/2010 |

(Continued)

OTHER PUBLICATIONS

"3GPP TS 24.501 V16.3.0", 3GPP TS 24.501 version 16.3.0, Dec. 2019, 645 pages.

(Continued)

*Primary Examiner* — Nicholas Sloms
(74) *Attorney, Agent, or Firm* — Colby Nipper PLLC

(57) ABSTRACT

This document describes methods, devices, systems, and means for performing a regrouping of a user equipment (UE) (113) between user equipment-coordination sets (UECS) by a base station (121) in which the base station (121) determines to regroup a user equipment (113) from a source UECS to a target UECS and transmits a release message to a coordinating UE (111) of the source UECS requesting the coordinating UE (111) of the source UECS to release the user equipment (113) from the source UECS (605). The base station (121) transmits a request message to a coordinating UE (114) of the target UECS requesting the coordinating UE (114) of the target UECS to add the user equipment (113) to the target UECS (610), and transmits a regrouping message to the user equipment (113) that is effective to direct the user equipment (113) is to perform a regrouping from the source UECS to the target UECS (615).

19 Claims, 10 Drawing Sheets

(56) References Cited

U.S. PATENT DOCUMENTS

| | | |
|---|---|---|
| 9,210,550 B2 | 12/2015 | Koc et al. |
| 9,253,783 B2 | 2/2016 | Wang et al. |
| 9,271,194 B2 | 2/2016 | Lu et al. |
| 9,344,159 B2 | 5/2016 | Zhuang |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,178,696 B2 | 1/2019 | Cheng et al. |
| 10,201,003 B2 | 2/2019 | Guo et al. |
| 10,218,422 B2 | 2/2019 | Raghavan et al. |
| 10,412,691 B1 | 9/2019 | Marupaduga et al. |
| 10,542,556 B2 | 1/2020 | Mallik |
| 10,893,572 B2 | 1/2021 | Wang et al. |
| 11,350,439 B2 | 5/2022 | Wang et al. |
| 2004/0203973 A1 | 10/2004 | Khan |
| 2004/0233858 A1* | 11/2004 | Karaoguz .......... H04W 8/186 370/254 |
| 2007/0223423 A1 | 9/2007 | Kim et al. |
| 2010/0027487 A1 | 2/2010 | Ihm et al. |
| 2010/0103983 A1 | 4/2010 | Wang et al. |
| 2010/0297993 A1 | 11/2010 | Heo et al. |
| 2011/0124294 A1 | 5/2011 | Dwyer et al. |
| 2011/0158117 A1 | 6/2011 | Ho et al. |
| 2012/0102409 A1 | 4/2012 | Fan et al. |
| 2012/0120821 A1 | 5/2012 | Kazmi et al. |
| 2012/0157139 A1 | 6/2012 | Noh et al. |
| 2012/0236735 A1 | 9/2012 | Nory et al. |
| 2012/0264443 A1 | 10/2012 | Ng et al. |
| 2013/0034136 A1 | 2/2013 | Park et al. |
| 2013/0041954 A1 | 2/2013 | Kim et al. |
| 2013/0107848 A1 | 5/2013 | Kang et al. |
| 2013/0130684 A1 | 5/2013 | Gomes et al. |
| 2013/0138817 A1* | 5/2013 | Zhang ............... H04L 67/12 709/226 |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0329711 A1 | 12/2013 | Seo et al. |
| 2014/0010131 A1 | 1/2014 | Gaal et al. |
| 2014/0029591 A1 | 1/2014 | Anderson |
| 2014/0127991 A1 | 5/2014 | Lim et al. |
| 2014/0148168 A1 | 5/2014 | Aoyagi et al. |
| 2014/0169261 A1 | 6/2014 | Ming et al. |
| 2014/0177456 A1 | 6/2014 | Boudreau et al. |
| 2014/0226575 A1* | 8/2014 | Davydov ............ H04W 4/06 370/329 |
| 2014/0274081 A1 | 9/2014 | Comeau et al. |
| 2014/0321433 A1 | 10/2014 | Xiao et al. |
| 2015/0043390 A1* | 2/2015 | Wang ................. H04L 5/1469 370/280 |
| 2015/0098397 A1 | 4/2015 | Damnjanovic et al. |
| 2015/0110040 A1 | 4/2015 | Zhao |
| 2015/0139197 A1 | 5/2015 | He et al. |
| 2015/0139203 A1* | 5/2015 | Miryala .......... H04W 28/0263 370/338 |
| 2015/0163822 A1 | 6/2015 | Guo et al. |
| 2015/0195795 A1 | 7/2015 | Loehr et al. |
| 2015/0288427 A1 | 10/2015 | Wang et al. |
| 2015/0358860 A1 | 12/2015 | Lu et al. |
| 2015/0373730 A1 | 12/2015 | Fujishiro et al. |
| 2015/0382142 A1* | 12/2015 | Kim ................... H04W 4/022 455/41.2 |
| 2016/0007138 A1* | 1/2016 | Palanisamy .......... H04W 4/50 455/41.2 |
| 2016/0021526 A1 | 1/2016 | Niu et al. |
| 2016/0044634 A1 | 2/2016 | Seo et al. |
| 2016/0057604 A1* | 2/2016 | Luo ................... H04W 8/005 370/330 |
| 2016/0128123 A1* | 5/2016 | Li ..................... H04B 7/026 370/252 |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0227463 A1* | 8/2016 | Baligh ................ H04W 40/16 |
| 2016/0323832 A1 | 11/2016 | Love et al. |
| 2017/0070931 A1 | 3/2017 | Huang et al. |
| 2017/0078333 A1 | 3/2017 | Tevlin |
| 2017/0086061 A1* | 3/2017 | Huang ................ H04W 4/08 |
| 2017/0188206 A1* | 6/2017 | Schmitt ............... H04W 40/24 |
| 2017/0188406 A1 | 6/2017 | Baligh et al. |
| 2017/0230986 A1 | 8/2017 | Moon et al. |
| 2017/0265227 A1* | 9/2017 | Wang ................. H04W 72/04 |
| 2017/0332389 A1 | 11/2017 | Sun et al. |
| 2017/0339530 A1 | 11/2017 | Maaref |
| 2017/0359759 A1 | 12/2017 | Brown et al. |
| 2018/0020444 A1 | 1/2018 | Lee et al. |
| 2018/0027393 A1* | 1/2018 | Yang ................. H04W 4/10 455/519 |
| 2018/0115932 A1 | 4/2018 | Gomes et al. |
| 2018/0145805 A1 | 5/2018 | Maaref |
| 2018/0146471 A1* | 5/2018 | Xu .................... H04L 67/12 |
| 2018/0184386 A1 | 6/2018 | Heo et al. |
| 2018/0235020 A1 | 8/2018 | Maaref |
| 2018/0317130 A1 | 11/2018 | Jin et al. |
| 2018/0352511 A1 | 12/2018 | Martin et al. |
| 2019/0007844 A1 | 1/2019 | Müller et al. |
| 2019/0037560 A1 | 1/2019 | Huang et al. |
| 2019/0075604 A1 | 3/2019 | Wang et al. |
| 2019/0081657 A1 | 3/2019 | Zeng et al. |
| 2019/0082428 A1 | 3/2019 | Maaref et al. |
| 2019/0174346 A1 | 6/2019 | Murray et al. |
| 2019/0174472 A1 | 6/2019 | Lee et al. |
| 2019/0208539 A1 | 7/2019 | Christoffersson et al. |
| 2019/0261443 A1 | 8/2019 | Baligh et al. |
| 2019/0312616 A1* | 10/2019 | Christoffersson ..... H04L 5/0051 |
| 2020/0015192 A1 | 1/2020 | Chun |
| 2020/0037119 A1 | 1/2020 | Yang |
| 2020/0092685 A1* | 3/2020 | Fehrenbach ......... H04B 7/2606 |
| 2020/0120649 A1 | 4/2020 | Nimbalker et al. |
| 2020/0137754 A1 | 4/2020 | Kim et al. |
| 2020/0154442 A1 | 5/2020 | Zhou |
| 2020/0374970 A1 | 11/2020 | Wang et al. |
| 2021/0160850 A1 | 5/2021 | Akkarakaran et al. |
| 2021/0345358 A1 | 11/2021 | Wang et al. |
| 2021/0345381 A1 | 11/2021 | Wang et al. |
| 2021/0385903 A1 | 12/2021 | Wang et al. |
| 2022/0006493 A1 | 1/2022 | Wang et al. |
| 2022/0086653 A1 | 3/2022 | Wang et al. |
| 2022/0141676 A1 | 5/2022 | Wang et al. |
| 2022/0191967 A1 | 6/2022 | Wang et al. |

FOREIGN PATENT DOCUMENTS

| | | |
|---|---|---|
| CN | 103313197 | 9/2013 |
| CN | 104429142 | 3/2015 |
| EP | 2953393 | 12/2015 |
| EP | 3282786 | 2/2018 |
| EP | 3425936 | 1/2019 |
| GB | 2562109 | 11/2018 |
| KR | 20080089457 | 10/2008 |
| KR | 20090118058 | 11/2009 |
| WO | 0237771 | 5/2002 |
| WO | 2008147654 | 12/2008 |
| WO | 2013057047 | 4/2013 |
| WO | 2013091229 | 6/2013 |
| WO | 2014179958 | 11/2014 |
| WO | 2015074270 | 5/2015 |
| WO | 2015123405 | 8/2015 |
| WO | 2015163798 | 10/2015 |
| WO | 2016081375 | 5/2016 |
| WO | 2017023785 | 2/2017 |
| WO | 2017117253 | 7/2017 |
| WO | 2017148173 | 9/2017 |
| WO | 2018010818 | 1/2018 |
| WO | 2016163206 | 2/2018 |
| WO | 2018020015 | 2/2018 |
| WO | 2018031770 | 2/2018 |
| WO | 2018130115 | 7/2018 |
| WO | 2018169343 | 9/2018 |
| WO | 2018192699 | 10/2018 |
| WO | 2018202797 | 11/2018 |
| WO | 2018202798 | 11/2018 |

(56) References Cited

FOREIGN PATENT DOCUMENTS

| WO | 2019001039 | 1/2019 |
|---|---|---|
| WO | 2019016141 | 1/2019 |
| WO | 2020113010 | 6/2020 |
| WO | 2020139811 | 7/2020 |
| WO | 2020172022 | 8/2020 |
| WO | 2020186097 | 9/2020 |
| WO | 2020236429 | 11/2020 |
| WO | 2021002859 | 1/2021 |
| WO | 2021029879 | 2/2021 |
| WO | 2021054964 | 3/2021 |

OTHER PUBLICATIONS

"3rd Generation Partnership Project; Technical Specification Group Services and System Aspects; Security architecture and procedures for 5G system", 3GPP TS 33.501 version 16.1.0 Release 16, Dec. 2019, 202 pages.
"5G; Non-Access-Stratum (NAS) protocol for 5G System (5GS); Stage 3", 3GPP TS 24.501 version 15.1.0 Release 15, Oct. 2018, 406 pages.
"International Search Report and Written Opinion", Application No. PCT/US2020/031716, dated Jul. 20, 2020, 14 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
Aboba, et al., "Extensible Authentication Protocol (EAP)", RFC Editor; Retrieved from https://www.rfc-editor.org/info/rfc3748, Jun. 2004, 67 pages.
Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
"International Preliminary Report on Patentability", Application No. PCT/US2019/068265, dated Jan. 18, 2021, 33 pages.
"Corrected Notice of Allowance", U.S. Appl. No. 16/419,854, filed Dec. 16, 2020, 2 pages.
"Notice of Allowance", U.S. Appl. No. 16/419,854, filed Nov. 5, 2020, 11 pages.
"Written Opinion", Application No. PCT/US2019/068265, dated Sep. 25, 2020, 20 pages.
"Evolved Universal Terrestrial Radio Access (E-UTRA)—Medium Access Control (MAC) Protocol Specification", 3GPP TS 36.321 Version 12 5. Release 12, Apr. 2015, 79 pages.
"Foreign Office Action", TW Application No. 20209124827, dated Sep. 17, 2021, 13 pages.
"International Preliminary Report on Patentability", Application No. PCT/US2020/031716, dated Oct. 15, 2021, 7 pages.
Tavanpour, "Upload User Collaboration in the Data Upload for LTE-Advanced Networks", Carleton University, Ottawa, Ontario,, Jan. 2016, 199 pages.
"Discussion on NR Beamforming with UE-Group-Specific Beam Sweeping", 3GPP TSG-RAN WG1 Meeting #86 R1 -166219, Gothenburg, Sweden, Aug. 22-26, 2016, Aug. 22, 2016, 7 pages.
"International Search Report and Written Opinion", PCT Application No. PCT/US2019/043355, dated Mar. 31, 2020, 12 pages.
"International Search Report and Written Opinion", PCT Application No. PCT/US2019/063620, dated Mar. 9, 2020, 14 pages.
"International Search Report and Written Opinion", PCT Application No. PCT/US2019/046374, dated Apr. 14, 2020, 13 pages.
"International Search Report and Written Opinion", PCT Application No. PCT/US2019/068265, dated Apr. 29, 2020, 29 pages.
"International Search Report and Written Opinion", PCT Application No. PCT/US2019/052005, dated May 18, 2020, 14 pages.
"International Search Report and Written Opinion", PCT Application No. PCT/US2020/022460, dated May 26, 2020, 13 pages.
"International Search Report and Written Opinion", PCT Application No. PCT/US2020/017930, dated May 29, 2020, 14 pages.
"Invitation to Pay Additional Fees", PCT Application No. PCT/US2019/068265, dated Mar. 13, 2020, 13 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"Non-Final Office Action", U.S. Appl. No. 16/419,854, filed Jun. 30, 2020, 29 Pages.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Wu, "Handling Overheating in a Wireless-Communication Device", Technical Disclosure Commons; Retrieved from https://www.tdcommons.org/dpubs_series/2343, Jul. 12, 2019, 22 pages.
Zhang, et al., "Grant-less Uplink Transmission for LTE Operated in Unlicensed Spectrum", Feb. 14, 2018, 6 pages.
"International Preliminary Report on Patentability", Application No. PCT/US2019/063620, dated May 25, 2021, 8 pages.
"Written Opinion", PCT Application No. PCT/US2020/031716, dated Mar. 25, 2021, 6 pages.
"International Preliminary Report on Patentability", Application No. PCT/US2020/031716, dated Jul. 30, 2021, 7 pages.
"International Preliminary Report on Patentability", Application No. PCT/US2020/017930, dated Aug. 10, 2021, 9 pages.
"International Preliminary Report on Patentability", Application No. PCT/US2020/022460, dated Aug. 25, 2021, 8 pages.
"Non-Final Office Action", U.S. Appl. No. 16/969,539, filed Sep. 16, 2021, 13 pages.
"Written Opinion", Application No. PCT/US2020/031716, dated Aug. 20, 2021, 6 pages.
"Foreign Office Action", IN Application No. 202147025618, dated Mar. 11, 2022, 5 pages.
"Foreign Office Action", IN Application No. 202147051065, dated Mar. 28, 2022, 8 pages.
"Foreign Office Action", IN Application No. 202147041653, dated Apr. 26, 2022, 6 pages.
"International Preliminary Report on Patentability", Application No. PCT/US2019/052005, dated Mar. 31, 2022, 8 pages.
"Non-Final Office Action", U.S. Appl. No. 16/969,105, filed Apr. 29, 2022, 8 pages.
"Notice of Allowance", U.S. Appl. No. 16/969,539, filed Mar. 30, 2022, 5 pages.
"Foreign Office Action", EP Application No. 19756050.1, dated Jan. 24, 2022, 4 pages.
"Foreign Office Action", KR Application No. 10-2020-7022366, dated Feb. 23, 2022, 11 pages.
"Foreign Office Action", IN Application No. 202147031380, dated Mar. 8, 2022, 8 pages.
"International Preliminary Report on Patentability", Application No. PCT/US2019/043355, dated Jan. 25, 2022, 7 pages.
"International Preliminary Report on Patentability", Application No. PCT/US2019/046374, dated Feb. 8, 2022, 8 pages.
"Notice of Allowance", U.S. Appl. No. 16/969,105, filed Feb. 7, 2022, 7 pages.
"Notice of Allowance", U.S. Appl. No. 16/969,539, filed Dec. 30, 2021, 8 pages.
"Final Office Action", U.S. Appl. No. 16/969,105, dated Oct. 11, 2022, 9 pages.
"Foreign Office Action", CA Application No. 3,127,384, dated Sep. 27, 2022, 4 pages.
"Foreign Office Action", IN Application No. 202247001696, dated Oct. 21, 2022, 6 pages.

(56) References Cited

OTHER PUBLICATIONS

"Final Office Action", EP Application No. 19783187.8, dated Jan. 27, 2023, 4 pages.
"Foreign Office Action", EP Application No. 19827946.5, dated Feb. 24, 2023, 7 pages.
"Notice of Allowance", U.S. Appl. No. 16/969,105, dated Feb. 1, 2023, 7 pages.

* cited by examiner

USER-EQUIPMENT-COORDINATION-SET REGROUPING

BACKGROUND

Generally, a provider of a wireless network manages wireless communications over the wireless network. For example, a base station manages a wireless connection with a user equipment (UE) that is connected to the wireless network. The base station determines configurations for the wireless connection, such as bandwidth, timing, and protocol for the wireless connection.

The quality of service between the UE and the base station can be degraded by a number of factors, such as loss in signal strength, bandwidth limitations, interfering signals, and so forth. This is particularly true for UEs operating at a cell edge, which is frequently troubled by weak signal quality. A number of solutions have been developed to address cell-edge issues occurring in certain wireless communication systems. However, techniques to improve cell-edge issues lack capabilities to manage effects caused by user-equipment mobility or dynamically changing radio environments of the user equipment.

SUMMARY

This summary is provided to introduce simplified concepts of a UE-coordination-set regrouping. The simplified concepts are further described below in the Detailed Description. This summary is not intended to identify essential features of the claimed subject matter nor is it intended for use in determining the scope of the claimed subject matter.

In aspects, methods, devices, systems, and means for performing a regrouping of a user equipment between user equipment-coordination sets (UECS) by a base station are described in which the base station determines to regroup a user equipment from a source UECS to a target UECS and transmits a release message to a coordinating UE of the source UECS requesting the coordinating UE of the source UECS to release the user equipment from the source UECS. The base station transmits a request message to a coordinating UE of the target UECS requesting the coordinating UE of the target UECS to add the user equipment to the target UECS and transmits a regrouping message to the user equipment that is effective to direct the user equipment is to perform a regrouping from the source UECS to the target UECS.

In other aspects, methods, devices, systems, and means for performing a regrouping of a user equipment between user equipment-coordination sets by a user equipment configured as a coordinating user equipment for a source user equipment-coordination set in a wireless communications network are described in which the coordinating user equipment receives a release message for a regrouping of a user equipment in the source UECS from a base station. The coordinating user equipment forwards information related to the user equipment to a coordinating user equipment of a target UECS for the regrouping, (e.g., via the base station or directly to the coordinating user equipment of the target UECS). In response to successfully forwarding the information, the coordinating user equipment transmits another release message to the user equipment that is effective to direct the user equipment to release from the source UECS.

In further aspects, methods, devices, systems, and means for performing a regrouping of a user equipment between user equipment-coordination sets by a user equipment configured as a coordinating user equipment for a target user equipment-coordination set in a wireless communications network are described in which the coordinating user equipment receives a request message for a regrouping of a user equipment to the target UECS from a base station. The coordinating user equipment receives information related to the user equipment from a coordinating user equipment of a source UECS for the regrouping. In response to receiving the request message, the coordinating user equipment transmits another request message to the user equipment that is effective to direct the user equipment to join from the target UECS.

BRIEF DESCRIPTION OF THE DRAWINGS

The details of one or more aspects of a UE-coordination-set regrouping are described below. The use of the same reference numbers in different instances in the description and the figures indicate similar elements.

DETAILED DESCRIPTION

Figure 1:
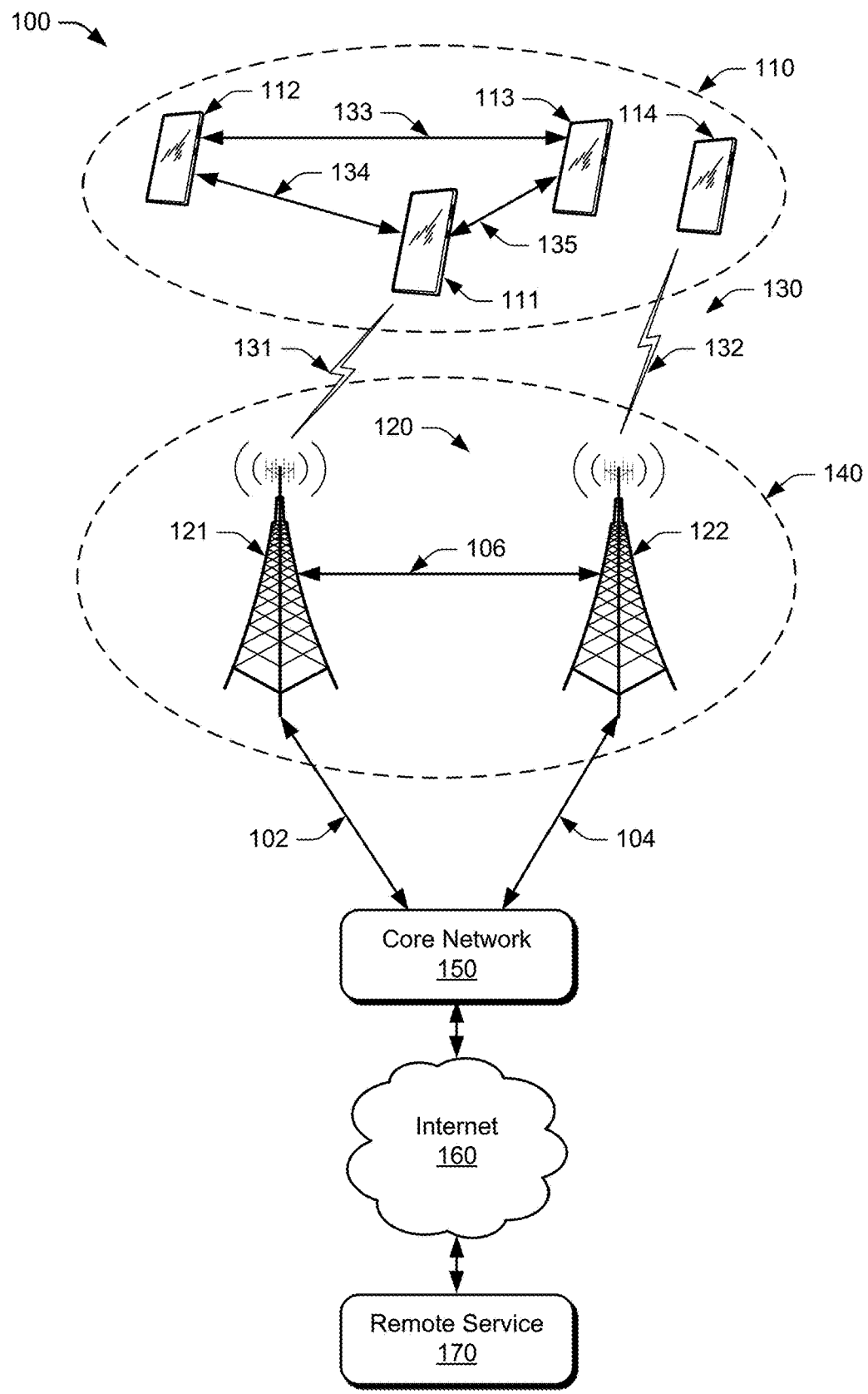
FIG. 1 illustrates an example operating environment in which aspects of a UE-coordination-set regrouping can be implemented.

This document describes techniques and apparatuses for a UE-coordination set (UECS) regrouping that facilitates more efficient data transmission in comparison to conventional wireless communication systems for a user equipment that is experiencing changes in operating conditions, such as changes due to mobility of the UE, changing atmospheric conditions affecting operation in a millimeter-wave radio band, changes in shielding or obstructions between the UE and a base station, or the like. A UE-coordination set is formed by multiple UEs assigned as a group to function together, similar to a distributed antenna, for the benefit of a particular UE. The UE-coordination set includes a coordinating UE that coordinates joint transmission and reception of downlink and/or uplink data for the particular UE (e.g., target UE) or multiple UEs in the UE-coordination set. By combining antennas and transmitters of multiple UEs in the UE-coordination set, the effective transmission power of the particular UE is significantly increased, and the effective signal quality is greatly improved.

Multiple UEs can each receive downlink data transmissions from the base station. These UEs may not decode the downlink transmissions into data packets and then forward the data packets to a destination, as in conventional relay techniques. Rather, the UEs determine where to forward raw I/Q samples of the downlink transmissions, such as to a coordinating UE or a target UE. In aspects, the target UE may be included in a subset of target UEs within the UE-coordination set. The coordinating UE (or the target UE) receives the raw I/Q samples from the other UEs in the UE-coordination set and stores the I/Q samples in a buffer memory for decoding. Then, the coordinating UE (or the target UE) synchronizes and decodes the stored raw I/Q samples into data packets for the target UE(s). Accordingly, the processing of the raw I/Q samples occurs at the coordinating UE or the target UE. In this way, the UE-coordination set acts as a distributed antenna for the target UE. The target UE includes its own antenna(s) and participates in the collecting of data in the I/Q format from the base station and forwarding the raw I/Q data to the coordinating UE. If the target UE is the coordinating UE, however, then the target UE does not forward the raw I/Q samples to itself.

In one use case, multiple UEs can form a UE-coordination set to transmit a message to a base station at a higher effective transmit power than would be possible for an individual UE. Additionally, those UEs can form a UE-coordination set to receive a message from the base station for one of the UEs at a higher effective receive power than would be possible for that one UE to individually receive. One of the multiple UEs acts as a coordinating UE for the UE-coordination group to aggregate data signals intended for a target UE and received by the UE-coordination group. Each of the UEs demodulates and samples the radio frequency signals and forwards the baseband samples to the coordinating UE using a local wireless network. Then, the coordinating UE aggregates and process the samples to generate decoded data and provide the decoded data to the target UE. Alternatively, the coordinating UE can forward the stored samples to the target UE to allow the target UE to demodulate the data.

In aspects, a base station determines that a change in operating conditions for a UE in a source UECS warrants regrouping the UE into a target UECS to improve communication performance for the UE. For example, the base station monitors locations of UEs in the UECSs that the base station manages and determines that, due to mobility, a UE in a source UECS is moving out of range of the source UECS. The base station determines that regrouping the UE into a target UECS will result in improved communication for the UE. To regroup the UE, the base station sends a release message to the coordinating UE of the source UECS to release the UE from the source UECS, and the base station sends a request message to the coordinating UE of the target UECS to add the UE to the target UECS. The regrouping of a user equipment between UECSs remedies degradations due to changes in the location of the UE or dynamically changing channel conditions to improve radio reception and data throughput for the user equipment. Furthermore, forming a completely new UECS with the user equipment to be released from the source UECS can be avoided. Rather, the user equipment to be released from the source UECS can be directly regrouped into another already existing target UECS.

In another aspect, the base station can assign the UE to be included in both the source UECS and the target UECS for a period of time. By temporarily assigning the UE to both the source UECS and the target UECS, the base station enables the UE to perform a seamless regrouping of the source UECS and the target UECS.

In a further aspect, if the user equipment belongs to both the source UECS and the target UECS, the base station specifies a time-division multiplexing (TDM) pattern for the UE to participate in transmission and reception in both UECSs. The base station provides the TDM pattern to the coordinating UEs of both UECSs to enable the coordinating UEs to coordinate communications for their respective UECSs based on the TDM pattern.

In another aspect, the coordinating UE of the source UECS forwards information about the UE to the coordinating UE of the target UECS. The UE-related information can be forwarded directly between the coordinating UEs when the coordinating UEs are within communication range of each other, or the UE-related information can be forwarded via the base station.

Example Environments

FIG. 1 illustrates an example environment 100, which includes multiple user equipment 110 (UE 110), illustrated as UE 111, UE 112, UE 113, and UE 114. Each UE 110 can communicate with one or more base stations 120 (illustrated as base stations 121 and 122) through wireless communication links 130 (wireless link 130), illustrated as wireless links 131 and 132. Each UE 110 in a UE-coordination set (illustrated as UE 111, UE 112, and UE 113) can communicate with a coordinating UE of the UE-coordination set and/or a target UE in the UE-coordination set through one or more local wireless network connections (e.g., WLAN, Bluetooth, NFC, a personal area network (PAN), WiFi-Direct, IEEE 802.15.4, ZigBee, Thread, mmWave) such as local wireless network connections 133, 134, and 135. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
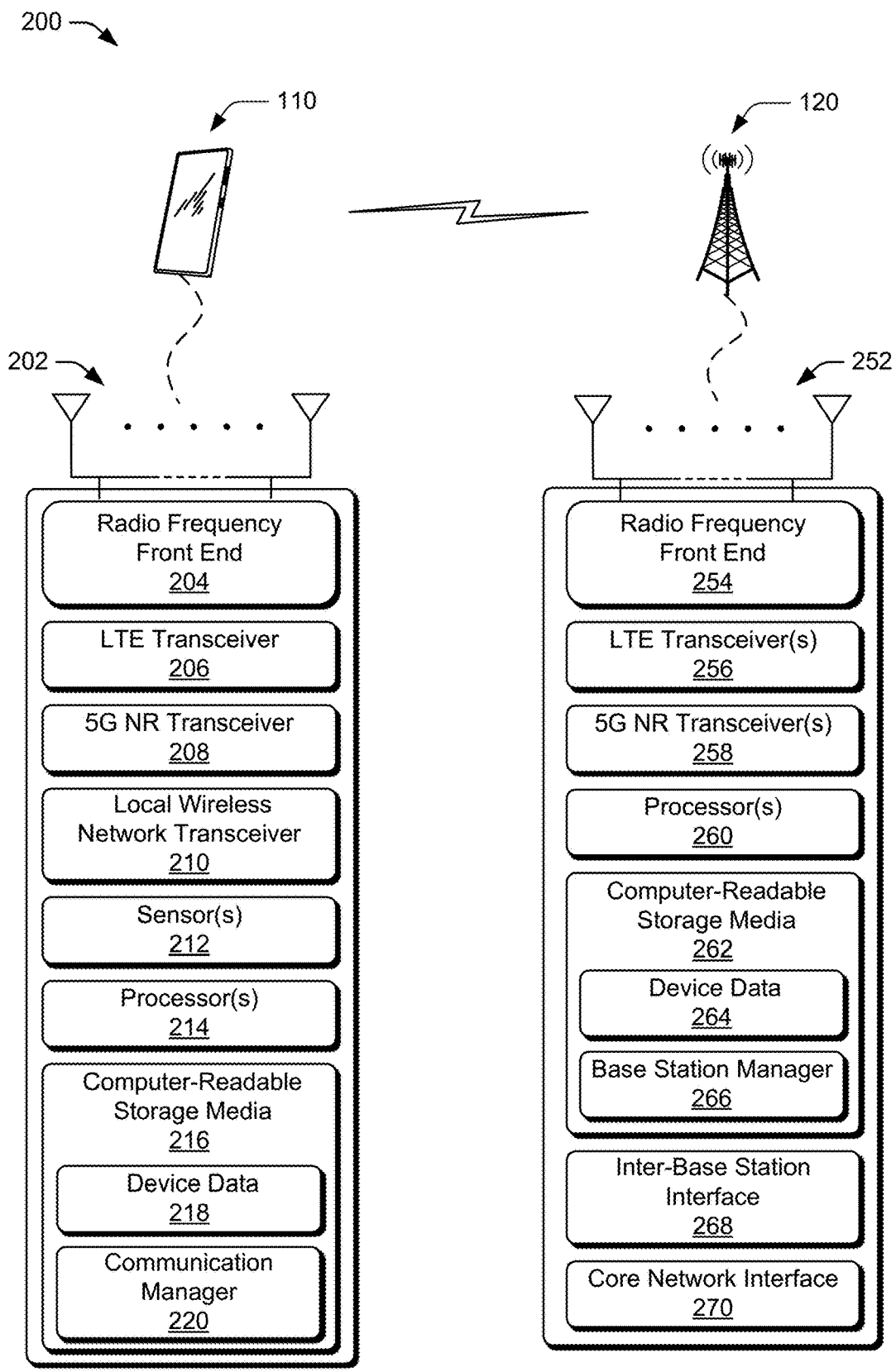
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of a UE-coordination-set regrouping. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220. Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for a UE-coordination-set regrouping.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Network Stack

Figure 3:
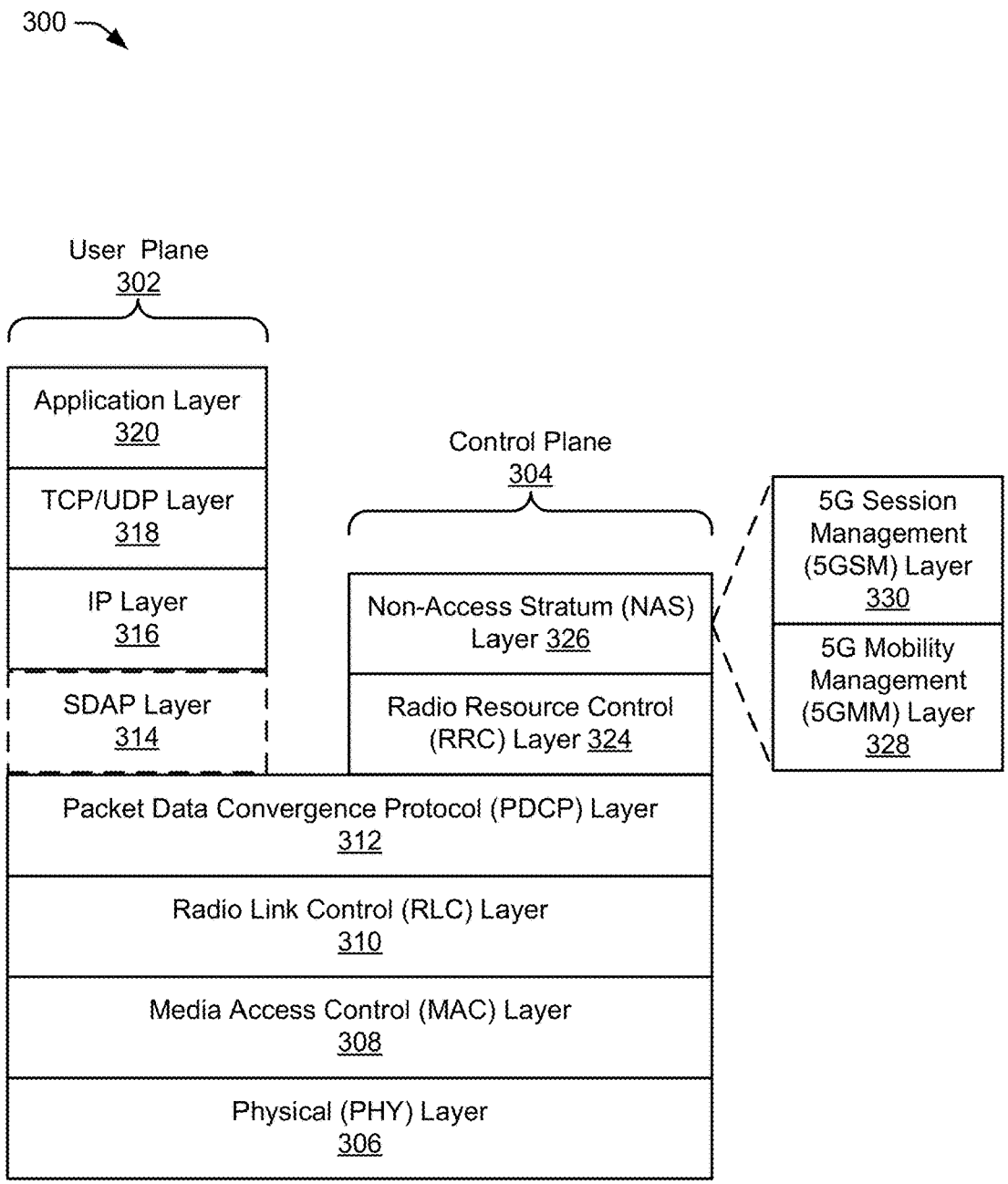
FIG. 3 illustrates an example block diagram of a wireless network stack model in which various aspects of a UE-coordination-set regrouping can be implemented.

FIG. 3 illustrates an example block diagram 300 of a wireless network stack model 300 (stack 300). The stack 300 characterizes a communication system for the example environment 100, in which various aspects of a UE-coordination-set regrouping can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management (e.g., using a Fifth-Generation Mobility Management (5GMM) layer 328) and packet data bearer contexts (e.g., using a Fifth-Generation Session Management (5GSM) layer 330) between the UE 110 and entities or functions in the core network, such as the Access and Mobility Management Function 152 (AMF 152) of the 5GC 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

UE-Coordination Set

Figure 4:
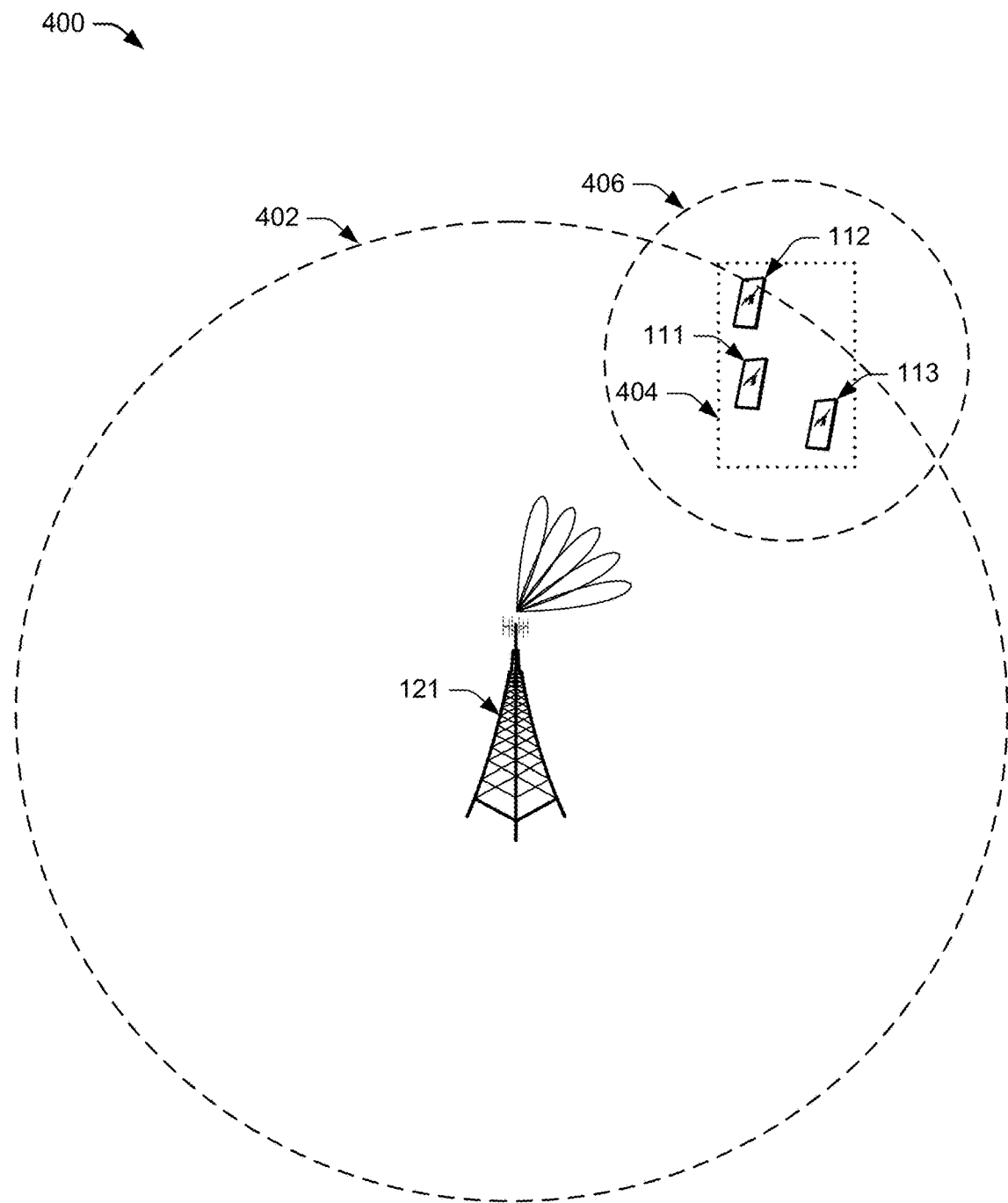
FIG. 4 illustrates an example environment in which various aspects of a UE-coordination-set regrouping can be implemented.

FIG. 4 illustrates an example implementation 400 of a UE-coordination-set regrouping. The illustrated example includes a base station 121, UE 111, UE 112, and UE 113. In an example, each of the UEs illustrated in FIG. 4 has limited transmission power, which may cause difficulties in transmitting data to the base station 121. This may be due, at least partially, to the UEs being proximate to a cell edge 402 of the base station 121 or the UEs being in a transmission-challenged location (e.g., a basement, urban canyon, etc.) that has a poor link budget. Each of the UEs illustrated in FIG. 4 may also, or alternatively, have limited reception sensitivity, which may be affected by cell-edge transmission power of the base station 121, as well as multipath, signal interference from other transmitters or overhead electrical wires, attenuation from weather or objects such as buildings, trees, etc.

Using the techniques described herein, the base station 121 can specify a set of UEs (e.g., the UE 111, UE 112, and UE 113) to form a UE-coordination set (e.g., the UE-coordination set 404) for joint transmission and joint reception of data for a target UE (e.g., the UE 112). The base station 121 may determine, based on information corresponding to the UEs (e.g., UE location, signal level, battery level, and so on), whether coordination is beneficial for a particular UE or not. Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 121 may determine a UE-coordination set based on various factors, such as a location of each UE relative to the base station 121, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam or beams that are close to each other. Timing advance may indicate a distance between a UE and the base station. A similar timing advance for each UE in a group indicates that those UEs are approximately the same distance from the base station. UEs within a predefined distance of one another that are all a similar distance from the base station may be capable of working together in a UE-coordination set in a distributed fashion to improve a signal strength and quality to the benefit of a single UE in the UE-coordination set.

The base station can send layer-2 messages (e.g., Media Access Control layer) and/or layer-3 (e.g., Service Data Adaptation Protocol layer) messages to UEs to direct or request those UEs to join the UE-coordination set. The base station can provide additional data to the UEs within the UE-coordination set to enable the UEs to communicate with at least the coordinating UE or the target UE. The additional data may include an identity of the coordinating UE and/or an identity of the target UE, security information, and/or local wireless network information.

The base station can receive a response message from a UE in the UE-coordination set acknowledging the request message. In some cases, the base station can receive a response message from at least two of the UEs acknowledging that a UE has joined the UE-coordination set. The response message may indicate that the request message has been approved by a user of the UE.

In addition, the base station can identify and command (or request) a specific UE within the UE-coordination set to act as a coordinating UE (e.g., master UE) for the UE-coordination set. For example, the base station 121 can transmit a configuration message (e.g., request message) to the specific UE to request that the specific UE act as the coordinating UE for the UE-coordination set. The specific UE may accept or decline the request based on user input from a user of the UE or a setting that is set to automatically accept or decline such requests. In some aspects, the UE may transmit a UE-capability message or other layer-3 message as a response to the request message from the base station 121. The coordinating UE can coordinate the messages and samples sent between UEs within the UE-coordination set for joint transmission and joint reception. In aspects, the coordinating UE can determine where the joint processing is to occur, e.g., at the coordinating UE or the target UE. In an example, the coordinating UE can coordinate how a particular UE in the UE-coordination set is to send I/Q samples, which the particular UE demodulates from signals received from the base station, to the target UE.

The base station can select the coordinating UE from the group of UEs in the UE-coordination set based on a variety of factors, some of which may be signaled to the base station by the UE using a UE-capability message. One example factor includes processing power of the coordinating UE, which provides the coordinating UE the capability to handle certain aspects of the UE-coordination set including central coordination or scheduling. Another factor may include a battery-level state of the coordinating UE. For instance, if a particular UE in the UE-coordination set has a low battery, then that UE may not be a good candidate to act as the coordinating UE. Accordingly, UEs within the UE-coordination set that have a battery-level state above a threshold value may be considered as candidates for selection as the coordinating UE. In one example, the base station may first select one UE as a coordinating UE, and receive, subsequent to formation of the UE-coordination set, messages from the other UEs in the UE-coordination set indicating respective battery-level states. Then, the base station can change the coordination UE if another UE in the UE-coordination set would be a better candidate based on the battery-level states of the UEs in the UE-coordination set.

Yet another factor may include a location of the coordinating UE. The base station may identify the location of the UEs in the UE-coordination set based on various factors, such as angle of arrival of signals from the UE, timing advance, observed time difference of arrival (OTDOA), and so on. An ideal location for the coordinating UE may be geographically central in the UE-coordination set, as this may maximize the coordinating UE's capability to coordinate and communicate with the other UEs in the UE-coordination set. However, the coordinating UE is not required to be in a central location of the UEs in the UE-coordination set. Rather, the coordinating UE can be located at any location within the UE-coordination set that allows the coordinating UE to communicate and coordinate with the other UEs in the UE-coordination set. The base station constantly monitors the UE-coordination set and can update the coordinating UE at any time based on updated factors, such as updated UE locations, UE battery-level state, and so on. Or, as mentioned previously, the coordinating UE may transfer its joint processing responsibilities to another UE based on factors such as processing power, battery level, and/or geographic location.

In some aspects, the base station can receive indications from one or more UEs in the UE-coordination set that advertise their capability to act as the coordinating UE. Additionally or alternatively, the base station can receive indications from one or more UEs in the UE-coordination set that indicate a willingness of a user of a respective UE to allow their UE to participate in the UE-coordination set and/or act as the coordinating UE. Accordingly, a UE in the UE-coordination set can indicate, using a layer-3 message, to the base station whether it is capable of acting and/or permitted to act as the coordinating UE.

In the illustrated example 400 in FIG. 4, the base station 121 may select UE 111 to act as the coordinating UE since the UE 111 is located between UE 112 and UE 113 or because the UE 111 is capable of communicating with each of the other UEs 112 and 113 in the UE-coordination set. The base station 121 may select the coordinating UE for various reasons, examples of which are described above. Being at the cell edge, all three of the UEs 111, 112, 113 have a weak cellular reception. The base station 121 selects UE 111 to coordinate messages and samples sent between the base station 121 and the UEs 111, 112, 113 for the target UE 112. Communication among the UEs can occur using a local wireless network 406, such as a PAN, NFC, Bluetooth, WiFi-Direct, local mmWave link, etc. In this example, all three of the UEs 111, 112, 113 receive RF signals from the base station 121. The UE 112 and the UE 113 demodulate the RF signals to baseband I/Q analog signals, sample the baseband I/Q analog signals to produce I/Q samples, and forward the I/Q samples along with system timing information (e.g., system frame number (SFN)) using the local wireless network 406 to the coordinating UE 111 using the local wireless network transceiver 210. The coordinating UE 111 then uses the timing information to synchronize and combine the I/Q samples and processes the combined signal to decode data packets for the target UE 112. The coordinating UE 111 then transmits the data packets to the target UE 112 using the local wireless network 406.

When the target UE 112 has uplink data to send to the base station 121, the target UE transmits the uplink data to the coordinating UE 111, which uses the local wireless network 406 to distribute the uplink data to each UE in the UE-coordination set 404. Each UE in the UE-coordination set 404 synchronizes with the base station 121 for timing information and its data transmission resource assignment. Then, all three UEs in the UE-coordination set 404 jointly transmit the uplink data to the base station 121. The base station 121 receives the jointly-transmitted uplink data from the UEs 111, 112, 113 and processes the combined signal to decode the uplink data from the target UE 112.

UE-Coordination-Set Regrouping

As discussed above, the UE-coordination set 404 enhances the target UE's ability to transmit data to the base station 121 and receive data from the base station 121 by generally acting as a distributed antenna of the target UE 112. The UE-coordination set 404 may be used by UEs 111, 112, and 113 when those UEs are within communication range of each other using the local wireless network connection or when the UEs are not impaired from communicating. However, when one of the UEs 110 in a UE-coordination set 404 can no longer effectively communicate with other UEs 110 in the UECS 404, that UE is no longer available to participate in joint communication (e.g., joint reception and/or joint transmission) of downlink data and uplink data with the other UEs 110 in the UE-coordination set 404.

Figure 5:
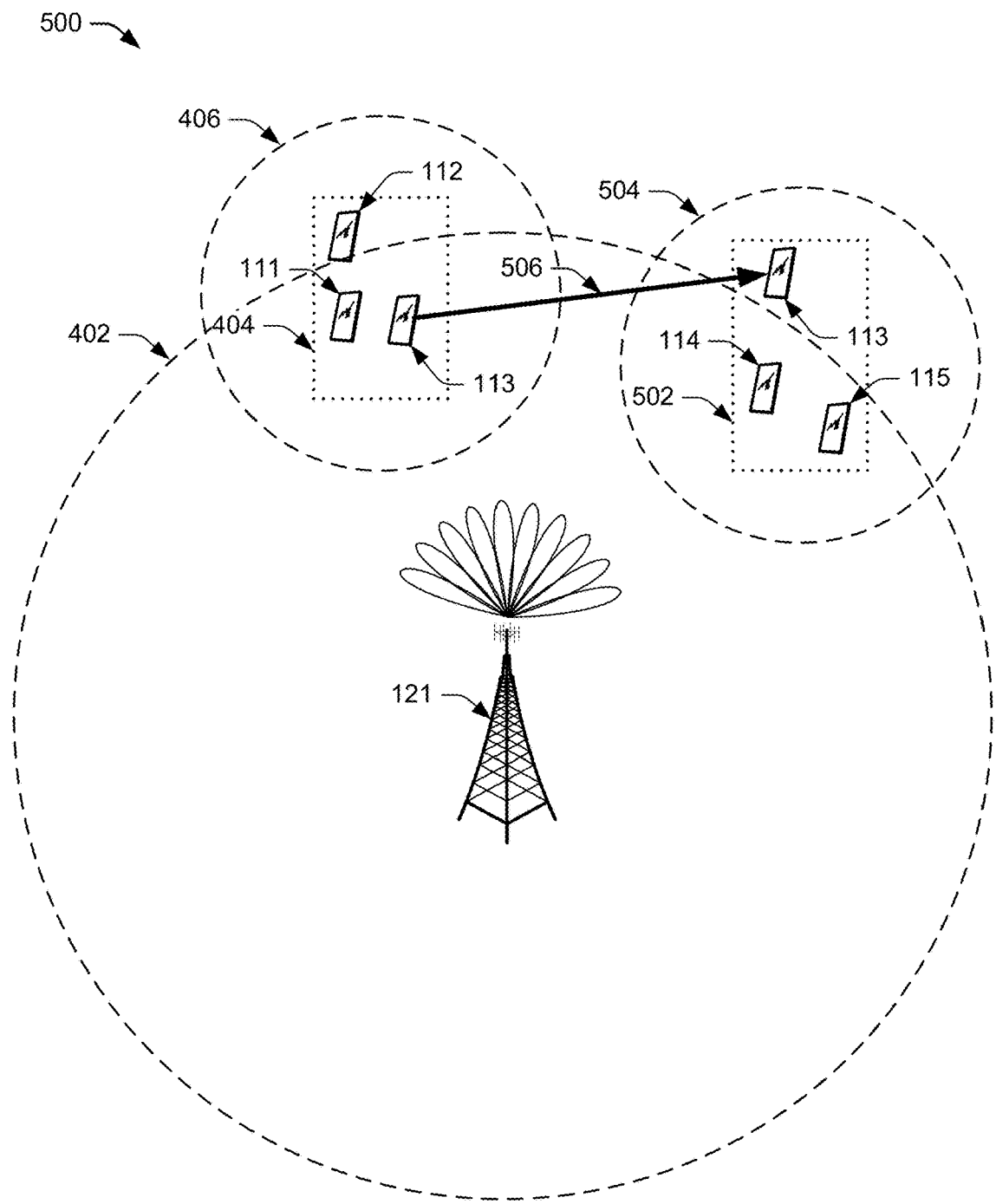
FIG. 5 illustrates an example environment in which various aspects of a UE-coordination-set regrouping can be implemented.

FIG. 5 illustrates an example implementation 500 of a UE-coordination-set regrouping. The illustrated example includes a system including the base station 121, UE 111, UE 112, UE 113, UE 114, and UE 115. As described with reference to FIG. 4, the base station 121 can form a UE-coordination set (e.g., the UE-coordination set 404, UECS 404, a source UECS) from a set of UEs (e.g., the UE 111, UE 112, and UE 113) for joint transmission and joint reception of data for a target UE (e.g., the UE 112). The base station 121 can also specify another set of UEs to form another UECS 502 (target UECS 502), such as a UECS at a different geographic location than the source UECS 404.

In aspects, the base station can identify and command (or request) a specific UE within the target UECS to act as a coordinating UE (e.g., master UE) for the target UE-coordination set. For example, the base station 121 can transmit a configuration message (e.g., request message) to the UE 114 to act as the coordinating UE for the target UECS 502. Communication between the UEs in the target UECS can occur using a local wireless network 504, such as a WLAN, PAN, NFC, Bluetooth, WiFi-Direct, local mmWave link, etc.

As described above with reference to FIG. 5 and using the techniques described herein, the base station 121 can specify a target UECS formed from a set of UEs (e.g., the UE 113, UE 114, and UE 115). The base station 121 may determine, based on information corresponding to the UEs (e.g., a signal quality of signals to or from the UE 113 dropping below a threshold value, UE location, channel conditions in a geographic area, or the like), whether and when to transfer a UE from a source UECS to a target UECS. For example, the base station 121 initially determines to include the UE 114 and the UE 115 in a UECS which will later become the target UECS 502. While it is in communication range of UE 111 and UE 112, the base station 121 has assigned the UE 113 to the UECS 404. When it is determined that the location of UE 113 is changing (while, for the sake of simplicity, the rest of the UEs remain in relatively the same geographic locations) and is better positioned to communicate as part of the target UECS 502 than as part of the source UECS 404, as illustrated at 506, the base station 121 regroups the UE 113 from the source UECS 404 to the target UECS 502. The base station 121 regroups the UE 113 by removing the UE 113 from the UECS 404 and adding the UE 113 to the target UECS 502 using the messaging described above in reference to FIG. 4 and below in reference to FIGS. 6 and 7.

Figure 6:
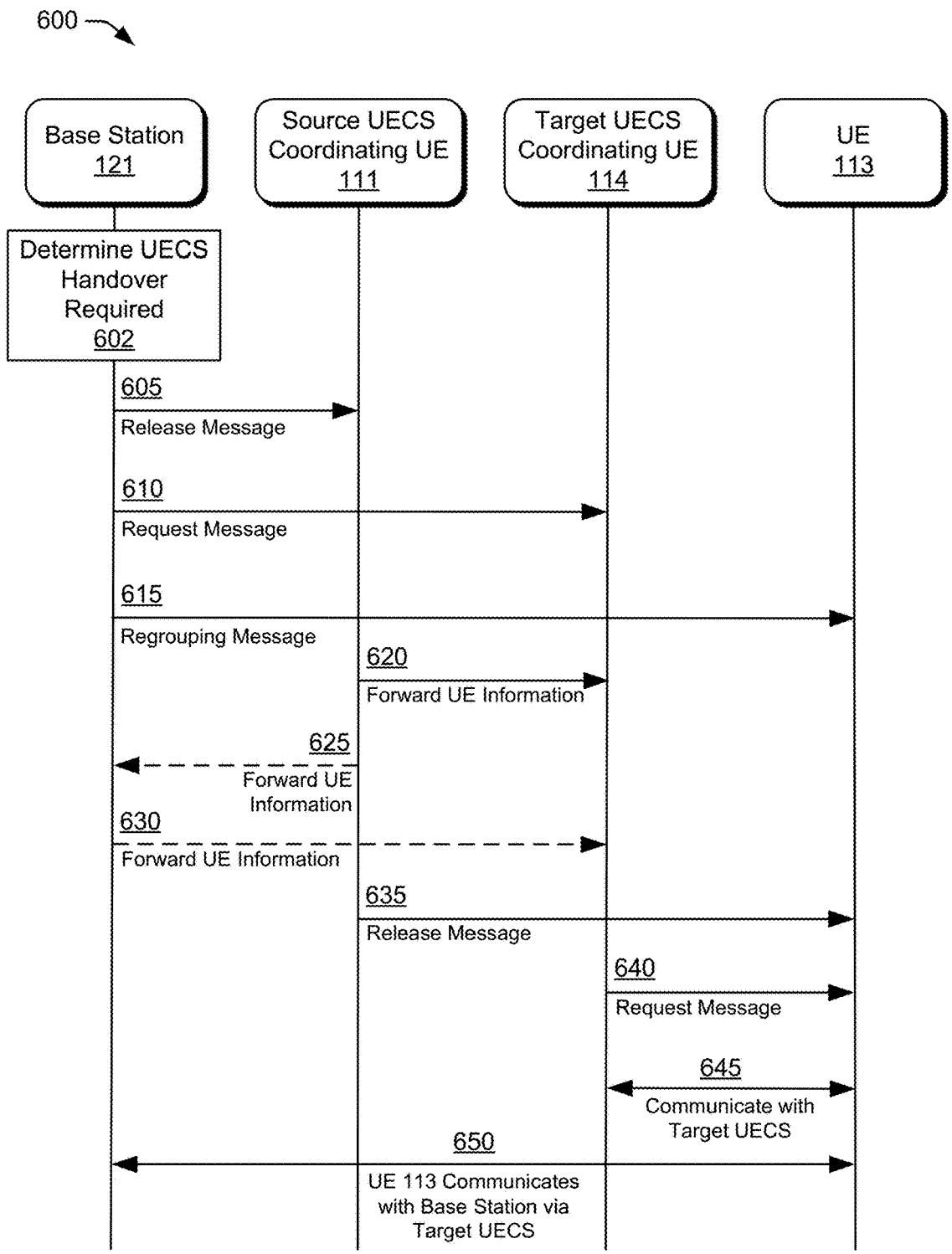
FIG. 6 illustrates example data and control transactions between devices of a regrouping of a user equipment between a source UE-coordination set and a target UE-coordination set in accordance with aspects of a UE-coordination-set regrouping.

FIG. 6 illustrates data and control transactions between devices of a regrouping of a user equipment from a source UE-coordination set into a target UE-coordination set in accordance with aspects of a UE-coordination-set regrouping. Although not illustrated for the sake of illustration clarity, various acknowledgements for messages illustrated in FIG. 6 may be implemented to ensure reliable operations of UECS regroupings.

In aspects, the base station 121 determines 602 to regroup the user equipment 113 from the source UECS 404 to the target UECS 502. For example, the base station 121 monitors the location of the UEs 110 to determine if a UE, such as UE 113, is changing location and may fall out of local wireless communication range of other UEs in the source UECS 404. Other factors include changing channel conditions for the UE 113, changing atmospheric conditions affecting millimeter-wave communications for the UE 113, changing obstructions in the environment of the UE 113 such as a large truck blocking radio signals, or the like.

In an example, the base station 121 can compare a geographic location of the user equipment 113 to a threshold distance to determine if the user equipment 113 is farther than the threshold distance from other UEs in the source UECS, and/or the base station 121 can compare the geographic location of the user equipment 113 to another threshold distance to determine if the user equipment 113 is less than the other threshold distance from the UEs in the target UECS. Based on either or both of these comparisons to threshold distances, the base station 121 can determine to regroup the UE 113.

In a second example, the base station 121 can compare a signal quality of radio conditions of the user equipment 113 to a threshold value for downlink signal quality, a threshold value for uplink signal quality, or both. The base station 121 can receive measurements of downlink signal quality from the user equipment 113, can make measurements of uplink signal quality of the UE 113, or both to compare to the thresholds for downlink or uplink signal quality to determine to regroup the UE 113.

In a third example, the coordinating UE of the source UECS 404 may transmit an indication of the signal quality for communications with the UE 113 signal quality over the local wireless network. The base station 121 may determine to perform a regrouping of the UE 113 if the signal quality for communications over the local wireless network communications have dropped below a threshold indicating that UECS communications with the UE 113 over the local wireless network may be deteriorating.

At 605, the base station transmits a release message to the coordinating UE 111 of the source UECS 404 that directs the coordinating UE 111 to release the UE 113 from the source UECS 404. For example, the base station can transmit the release message as a layer-2 message or a layer-3 message.

At 610, the base station transmits a request message to the coordinating UE 114 of the target UECS 502 that directs the coordinating UE 114 to add the UE 113 to the target UECS 502. For example, the base station can transmit the request message as a layer-2 message or a layer-3 message.

At 615, the base station transmits a regrouping message to the UE 113 that instructs the UE 113 to perform a regrouping from the source UECS 404 to the target UECS 502. The regrouping message includes information regarding the target UECS 502, such as the identity of the coordinating UE of the target UECS, timing and/or frequency information usable to synchronize and communicate with the coordinating UE of the target UECS, or the like. The base station can transmit the regrouping message as a layer-2 message or a layer-3 message.

The regrouping message may be received individually by the UE 113 or jointly received by the UEs in the source UECS 404 and forwarded to the UE 113 by the coordinating UE 111. The source UECS 404 and the target UECS 502 may communicate with the base station using the same radio frequency channel or different radio frequency channels. In an optional aspect, the regrouping message may include an indication of the cellular radio frequency channel used by the target UECS 502 that enables the user equipment 113 to change to the radio frequency used by the target UECS 502 as a part of performing the regrouping to the UECS 502.

At 620, the coordinating UE 111 of the source UECS 404 forwards information related to the UE 113 to the coordinating UE 114 of the target UECS 502. The UE-related information may be forward directly between the coordinating UE 111 and the coordinating UE 114 if the coordinating UEs are within communication range and share a common local wireless network technology. Optionally or additionally, the base station 121 can act as a broker to establish the communication between the coordinating UE 111 and the coordinating UE 114 by providing information about the target coordinating UE 114 to the source UE 111, such as the identity of the target coordinating UE, timing and/or frequency information usable to synchronize and communicate with the target coordinating UE, or the like. The coordinating UE 111 can communicate the UE-related information using licensed radio spectrum or unlicensed radio spectrum.

Alternatively to 620, at 625, the coordinating UE 111 of the source UECS 404 forwards information related to the UE 113 to the base station 121, and at 630 the base station 121 forwards the information related to the UE 113 to the coordinating UE 114 of the target UECS 502. For example, the UE-related information includes UE-capability information about the UE 113 such as local wireless network capabilities of the UE 113, a local wireless network identifier of the UE 113, radio-frequency capabilities of the UE 113 usable for scheduling or configuring joint communications, such as beamforming capabilities, supported radio frequency bands, or the like. Optionally or additionally, the target coordinating UE 114 transmits an acknowledgement (not illustrated) to the source coordinating UE 111 to acknowledge receiving the UE information at 620, or to the base station 121 to acknowledge receiving the UE information at 630.

At 635, the coordinating UE 111 of the source UECS 404 transmits a release message to the UE 113 to release the UE 113 from the source UECS 404. Optionally or additionally, the release message can be transmitting in conjunction with forwarding the UE information, at 620 or 630, to avoid timing race conditions between the release of the UE 113 from the source UECS and the UE 113 joining the target UECS. Optionally or additionally, if the source coordinating UE 111 expects to receive an acknowledgement (not illustrated) indicating that the target coordinating UE 114 received the UE information at 620 or 630, the source UE 111 uses the receipt of the acknowledgement to trigger the transmission of the release message, at 635.

At 640, the coordinating UE 114 of the target UECS 502 transmits a request message to the UE 113 to add the UE 113 to the target UECS 502. The coordinating UE 114 may transmit the request message based on receiving the UE information, at 620 or 630. Optionally, the source UE 111 can include timing information in the message that conveys the UE information, to indicate to a time at which the target coordinating UE 114 can transmit the release message. The source UECS and the target UECS may communicate with the base station using the same radio frequency channel or different radio frequency channels. In the case of the source UECS and the target UECS communicating with the base station using different radio frequency channels, the request message is effective to cause the user equipment to change radio frequencies for communications with the base station.

At 645, the UE 113 communicates with other UEs 110 in the target UECS 502, such as for the coordination of joint transmission and reception by the target UECS 502. At 650, the UE 113 communicates with the base station 121 using joint transmission and reception with the other UEs 110 in the target UECS 502.

Alternatively, to facilitate seamless UECS regroupings, the order of some messaging illustrated in FIG. 6 may be altered. For example, the request message shown at 640 may be transmitted before the release message at 635 to enable the UE 113 to more reliably perform the regrouping from the source UECS to the target UECS. For example, the source UE 111 waits to receive a message from the UE 113 indicating that the UE 113 has successfully joined the target UECS (not shown) before transmitting the release message at 635.

Figure 7A:
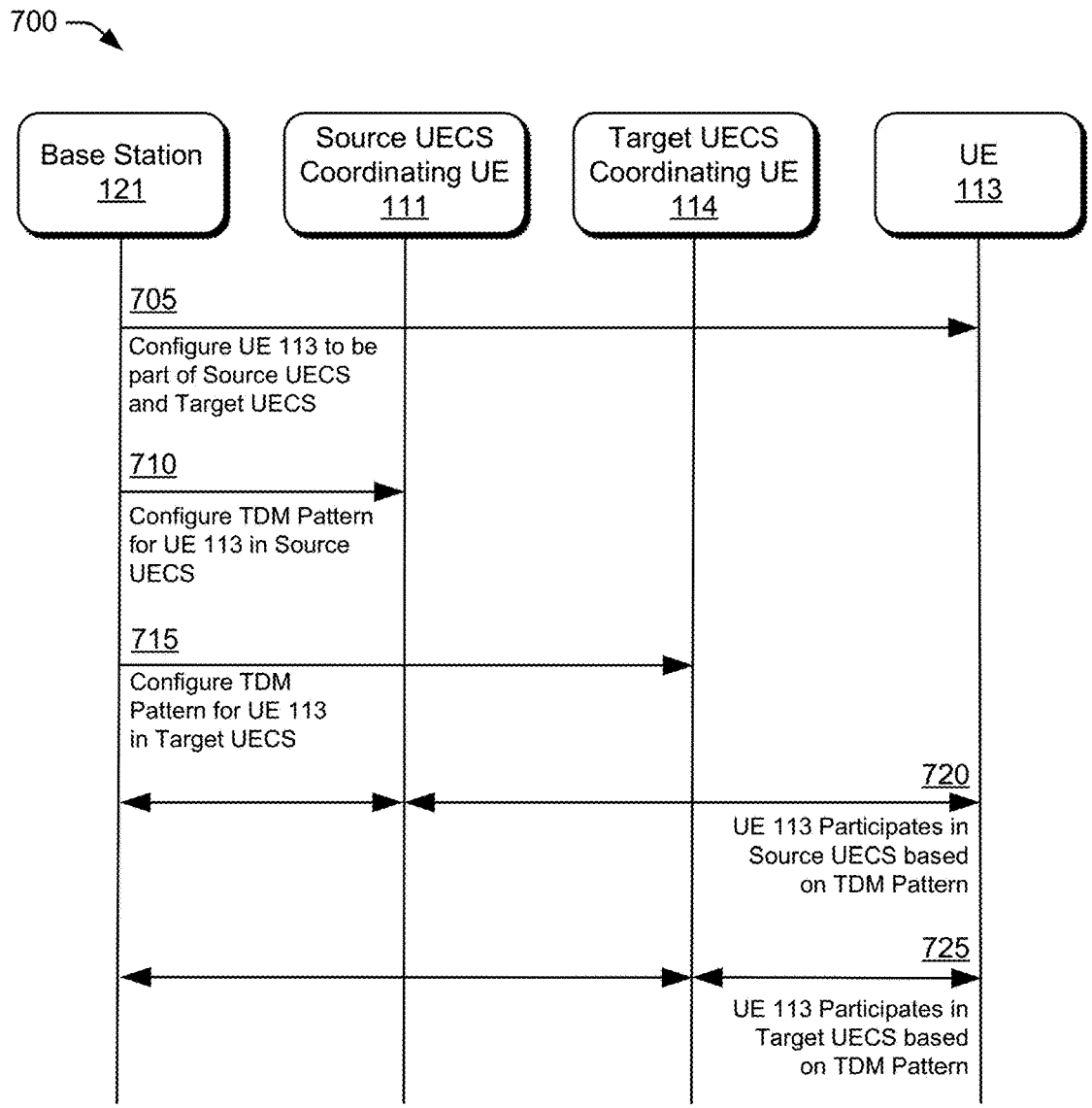
FIG. 7a illustrates additional example data and control transactions between devices of a regrouping of a user equipment between a source UE-coordination set and a target UE-coordination set in accordance with aspects of a UE-coordination-set regrouping.

FIG. 7a illustrates additional data and control transactions between devices during a regrouping of a user equipment between a source UE-coordination set and a target UE-coordination set in accordance with aspects of a UE-coordination-set regrouping. Although not illustrated for the sake of illustration clarity, various acknowledgements for messages illustrated in FIG. 7 may be implemented to ensure reliable operations of UECS regroupings.

During time periods when the UE 113 is a member of both the source UECS 404 and the destination UECS 502, the UE 113 can participate in joint communications with both UECSs using Time Division Multiplexing (TDM). By participating in both the source UECS and the destination UECS, the UE 113, the source UECS coordinating UE 111, and the target UECS coordinating UE 114 gain the benefits of joint transmission and joint reception to improve the link budget for the regrouping signaling for the UECS regrouping. By applying TDM to the participation of the UE in the two UECSs, the UE is not required to support a more complex implementation to simultaneously participate in joint communication in both UECSs.

At 705, the base station 121 configures the UE 113 to be a member of both the source UECS 404 and the target UECS 502. For example, this configuration of the UE 113 can include the control transactions illustrated with respect to FIG. 6, which add the UE 113 to the target UECS 502 before releasing the UE 113 from the source UECS 404, at 635.

At 710, the base station 121 configures and transmits the TDM pattern, for the UE 113 to participate in the source UECS 404, to the source UECS coordinating UE 111. For example, the base station can transmit the TDM pattern in a layer-2 message or a layer-3 message.

At 715, the base station 121 configures and transmits the TDM pattern, for the UE 113 to participate in the target UECS 502, to the target UECS coordinating UE 114. For example, the base station can transmit the TDM pattern in a layer-2 message or a layer-3 message. The coordinating UEs may in turn communicate the TDM pattern information to other UEs in their respective UECSs using the local wireless network (not shown). By communicating the TDM pattern to the coordinating UEs, each coordinating UE can take the TDM pattern into consideration when scheduling joint transmission or joint reception for its respective UECS. The coordinating UE may dynamically include or exclude a specific UE from joint reception or joint transmission to facilitate the TDM constraints of a particular UE, as needed. At 720, the UE 113 participates in communication as part of the source UECS 404, and at 725, the UE 113 participates in communication as part of the target UECS 502.

In aspects, the base station 121 can determine a time period for the UE 113 to participate in communication with both the source UECS 404 and the target UECS 502. The configuration at 705 can include a predetermined time period for joint participation or a termination time for ending the joint participation. At the end of the predetermined time period or at the termination time, the UE 113 can autonomously end participation in the source UECS 404 including send an optional message (not shown) to the coordinating UE 111 to indicate the end of participation in the source UECS 404, or the coordinating UE 111 may send a release message (not shown) to the UE 113 to direct the UE 113 to release from the source UECS.

Figure 7B:
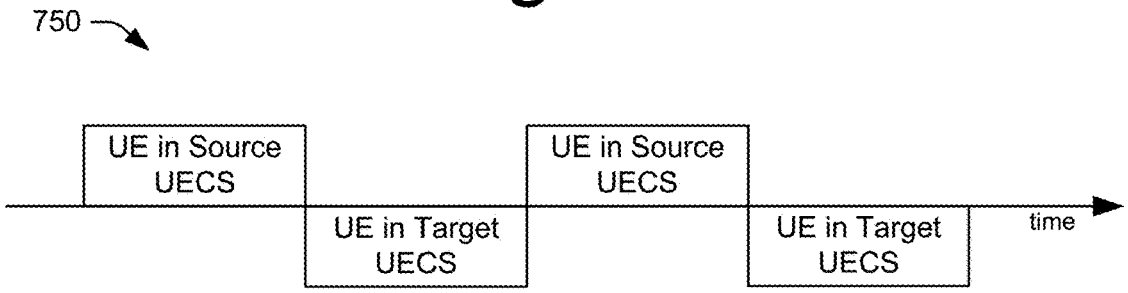
FIG. 7b illustrates an example time-division multiplexing pattern in accordance with aspects of a UE-coordination-set regrouping.

FIG. 7b illustrates an example time-division multiplexing pattern 750 in accordance with aspects of a UE-coordination-set regrouping. The base station 121 specifies time-division multiplexing for a user equipment to participate in multiple UECSs. In the example at 750, the base station 121 has allocated alternating time periods for the UE 113 to participate in the source UECS and the destination UECS. Although in the example 750, the time periods for each UECS are illustrated as being equal and adjacent, the base station can allocate the time the UE spends in either UECS in any suitable manner. In one aspect, in the case of the source UECS and the target UECS communicating with the base station using different radio frequency channels, the user equipment 113 changes between the radio frequencies of the source UECS and the target UECS, based on the TDM pattern and/or the scheduling of joint communications by the coordinating UEs of the source and target UECSs.

Example Methods

Example methods 800-1000 are described with reference to FIGS. 8, 9, and 10 in accordance with one or more aspects of a UE-coordination-set regrouping. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
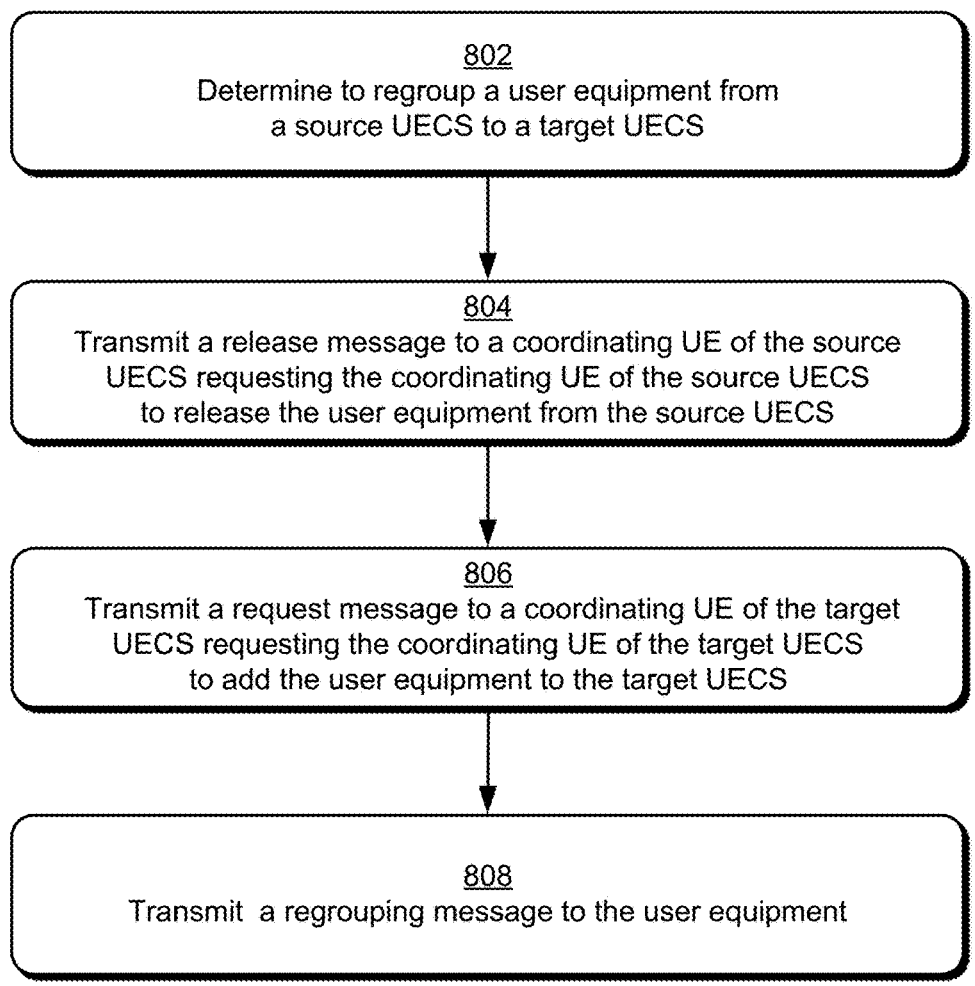
FIG. 8 illustrates an example method of a UE-coordination-set regrouping as generally related to the base station in accordance with aspects of the techniques described herein.

FIG. 8 illustrates example method(s) 800 of a UE-coordination-set regrouping as generally related to a base station. At 802, a base station determines to regroup a user equipment from a source UECS to a target UECS. For example, a base station (e.g., the base station 121) determines, based on changes in location of a UE (e.g., the UE 113) or the signal quality of uplink or downlink signals with UE 113, to regroup the UE 113 from a source UECS (e.g., the source UECS 404) to a target UECS (e.g., the target UECS 502) to improve communications performance for the user equipment 113.

At 804, the base station transmits a release message to a coordinating UE of the source UECS requesting the coordinating UE of the source UECS to release the user equipment from the source UECS. For example, the base station 121 transmits a release message (e.g., release message 605) to a coordinating UE (e.g., UE 111) of the source UECS 404 that is effective to direct the coordinating UE 111 of the source UECS 404 to transmit another release message (e.g., release message 635) to the user equipment 113 to direct the user equipment 113 to release from the source UECS 114.

At 806, the base station transmits a request message to a coordinating UE of the target UECS requesting the coordinating UE of the target UECS to add the user equipment to the target UECS. For example, the base station 121 transmits a request message (e.g., request message 610) to a coordinating UE (e.g., UE 114) of the target UECS 502 requesting the coordinating UE 114 of the target UECS 502 to add the user equipment 113 to the target UECS 502 that is effective to direct the coordinating UE 114 of the target UECS 502 to transmit another request message (e.g., request message 640) to the user equipment 113 to direct the user equipment 113 to join the target UECS 502.

At 808, the base station transmits a regrouping message to the user equipment. For example, the base station 121 transmits a regrouping message (e.g., regrouping message 615) to the user equipment 113 that is effective to direct the user equipment 113 to perform a regrouping from the source UECS 404 to the target UECS 502.

Figure 9:
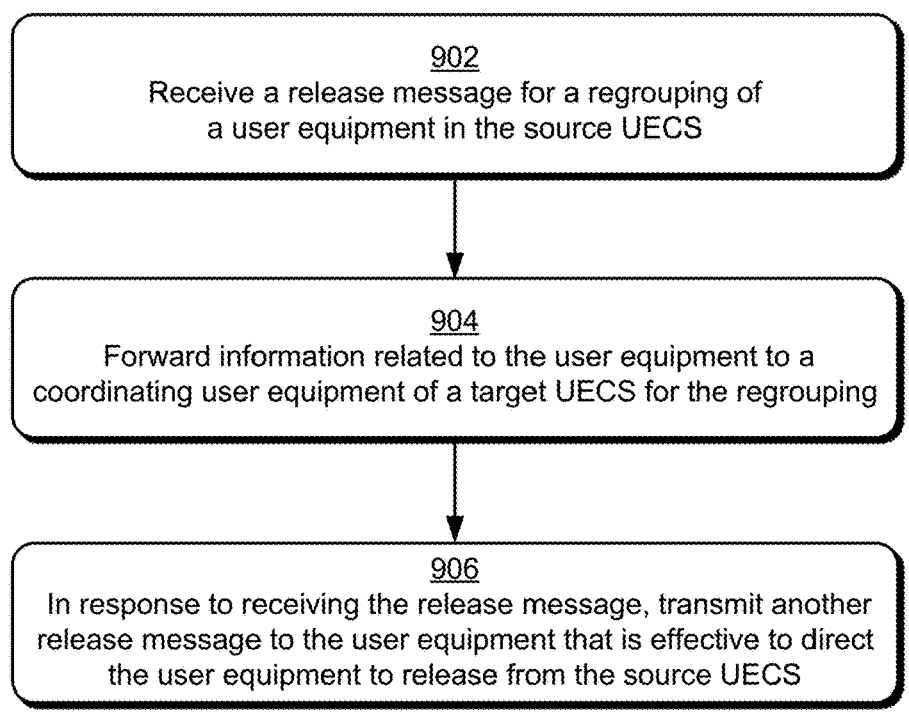
FIG. 9 illustrates an example method of a UE-coordination-set regrouping as generally related to the coordinating user equipment of the source UE-coordination set in accordance with aspects of the techniques described herein.

FIG. 9 illustrates example method(s) 900 of a UE-coordination-set regrouping as generally related to a coordinating user equipment of a source UECS. At 902, a coordinating user equipment of a source UECS receives a release message for a regrouping of a user equipment in the source UECS. For example, a coordinating user equipment (e.g., the UE 111) of a source UECS (e.g., the source UECS 404) receives a release message (e.g., release message 605) for a regrouping of a user equipment (e.g., the UE 113) in the source UECS 404. The release message 605 may include information related to the regrouping such as an identifier of a target UECS (e.g., the target UECS 502) or an identifier of a coordinating UE (e.g., the UE 114) for the target UECS 502.

At 904, the coordinating UE of the source UECS forwards information related to the user equipment to a coordinating user equipment of a target UECS for the regrouping. For example, the coordinating UE 111 of the source UECS 404 forwards information (e.g., forward UE information 620) related to the UE 113 to the coordinating user equipment 114 of the target UECS 502 for the regrouping. Information related to the UE 113 can include local wireless network capabilities of the UE 113, a local wireless network identifier of the UE 113, radio-frequency capabilities of the UE 113 usable for scheduling or configuring joint communications, such as beamforming capabilities, supported radio frequency bands, or the like. In an alternative example, the coordinating UE 111 of the source UECS 404 forwards information (e.g., forward UE information 625, 630) related to the UE 113 via a base station (e.g., the base station 121).

At 906, in response to receiving the release message, the coordinating UE of the source UECS transmits another release message to the user equipment that is effective to direct the user equipment to release from the source UECS. For example, the coordinating UE 111 of the source UECS 404 transmits another release message (e.g., release message 635) to the user equipment 113 that includes regrouping parameters received from the base station 121, such as a timing of the regrouping or the like.

Figure 10:
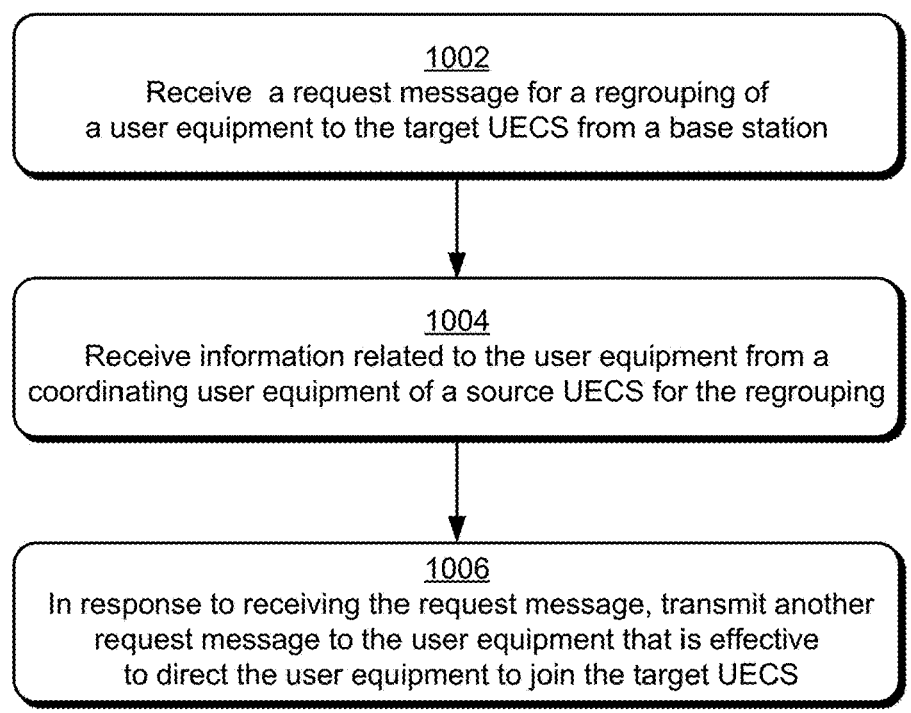
FIG. 10 illustrates an example method of a UE-coordination-set regrouping as generally related to the coordinating user equipment of the target UE-coordination set in accordance with aspects of the techniques described herein.

FIG. 10 illustrates example method(s) 1000 of a UE-coordination-set regrouping as generally related to a coordinating user equipment of the target UECS. At 1002, a coordinating user equipment of a target UECS receives a request message, for a regrouping of a user equipment to the target UECS, from a base station. For example, a coordinating user equipment (e.g., the UE 114) of a target UECS (e.g., the target UECS 502) receives a request message (e.g., request message 610), for a regrouping of a user equipment (e.g., the UE 113) to the target UECS 502, from a base station (e.g., the base station 121). The request message 610 may include information related to the regrouping such as an identifier of the UE 113 or an identifier of a coordinating UE (e.g., the UE 111) for a source UECS (e.g., the source UECS 404).

At 1004, the coordinating UE of the target UECS receives information related to the user equipment from a coordinating user equipment of a source UECS for the regrouping. For example, the coordinating UE 114 of the target UECS 502 receives information (e.g., forward UE information 620) related to the UE 113 from the coordinating UE 111 of the source UECS 404, such as local wireless network capabilities of the UE 113, a wireless network identifier of the UE 113, radio-frequency capabilities of the UE 113 usable for scheduling or configuring joint communications, such as beamforming capabilities, supported radio frequency bands, or the like. In an alternative example, the coordinating UE 114 of the target UECS 502 receives information related to the UE (e.g., forward UE information 625, 630) via the base station 121.

At 1006, in response to receiving the request message, the coordinating UE of the target UECS transmits another request message to the user equipment that is effective to direct the user equipment to join the target UECS. For example, the coordinating UE 114 of the target UECS 502 transmits another request message (e.g., request message 640) to the user equipment 113 that includes regrouping parameters received from the base station 121 and/or parameters related to the target UECS 502.

In the following some examples are described—

Example 1: A method to regroup a user equipment between user equipment coordination sets by a base station, the method comprising the base station:

determining to regroup the user equipment from a source user equipment-coordination set to a target user equipment-coordination set;

transmitting a release message to a coordinating user equipment of the source user equipment-coordination set requesting the coordinating user equipment of the source user equipment-coordination set to release the user equipment from the source user equipment-coordination set;

transmitting a request message to a coordinating user equipment of the target user equipment-coordination set requesting the coordinating user equipment of the target user equipment-coordination set to add the user equipment to the target user equipment-coordination set; and transmitting a regrouping message to the user equipment that is effective to direct the user equipment to perform a regrouping from the source user equipment-coordination set to the target user equipment-coordination set.

Example 2: The method of example 1, wherein the transmitting the release message to the coordinating user equipment of the source user equipment-coordination set is effective to direct the coordinating user equipment of the source user equipment-coordination set to forward information related to the user equipment to the coordinating user equipment of the target user equipment-coordination set.

Example 3: The method of example 2, wherein the coordinating user equipment of the source user equipment-coordination set forwards the information related to the user equipment to the coordinating user equipment of the target user equipment-coordination set using a local wireless network.

Example 4: The method of examples 2 or 3, the method further comprising the base station:

receiving the information related to the user equipment from the coordinating user equipment of the source user equipment-coordination set; and forwarding the information related to the user equipment to the coordinating user equipment of the target user equipment-coordination set.

Example 5: The method of any one of examples 2 to 4, wherein information related to the user equipment includes one or more of: an identity of the coordinating user equipment of the target user equipment-coordination set, timing information usable to synchronize and communicate with the coordinating user equipment of the target user equipment-coordination set, or frequency information usable to synchronize and communicate with the coordinating user equipment of the target user equipment-coordination set.

Example 6: The method of any one of the preceding examples, wherein the transmitting the request message to the coordinating user equipment of the target user equipment-coordination set is effective to direct the coordinating user equipment of the target user equipment-coordination set to transmit another request message to the user equipment to direct the user equipment to join the target user equipment-coordination set.

Example 7: The method of example 6, wherein the transmission of the other request message to the user equipment is effective to enable the user equipment within the target user equipment-coordination set to:

demodulate and sample a downlink signal from the base station; and forward samples of the downlink signal to the coordinating user equipment of the target user equipment-coordination set for joint processing of the samples with samples of the downlink signal received by one or more other user equipments in the target user equipment-coordination set.

Example 8: The method of any one of the preceding examples, wherein the determining to regroup the user equipment from the source user equipment-coordination set to the target user equipment-coordination set further comprises the base station:

determining that a geographic location of the user equipment has exceeded a threshold distance from the coordinating user equipment of the source user equipment-coordination set.

Example 9: The method of example 8, further comprising the base station:

receiving geographic location information from the user equipment; and receiving geographic location information from the other user equipments in the source user equipment-coordination set.

Example 10: The method of any one of the preceding examples, wherein the determining to regroup the user equipment from the source user equipment-coordination set to the target user equipment-coordination set further comprises the base station:

determining that a geographic location of the user equipment is less than a threshold distance from the coordinating user equipment of the target user equipment-coordination set.

Example 11: The method of example 10, further comprising the base station:

receiving geographic location information from the user equipment; and receiving geographic location information from the user equipments in the target user equipment-coordination set.

Example 12: The method of any one of the preceding examples, wherein the determining to regroup the user equipment from the source user equipment-coordination set to the target user equipment-coordination set further comprises the base station:

determining that a radio frequency signal quality for signals to or from the user equipment has dropped below a threshold value for signal quality.

Example 13: The method of example 12, wherein the determining that the radio frequency signal quality for the user equipment has dropped below the threshold value for the signal quality comprises the base station:

receiving one or measurements of a signal quality of downlink signals from the user equipment; and comparing the received measurements of the signal quality of the downlink signals to the threshold value for signal quality.

Example 14: The method of example 12, wherein the determining that the radio frequency signal quality for the user equipment has dropped below the threshold value for the signal quality comprises the base station:

measuring a signal quality of uplink signals from the user equipment; and comparing the measurements of the signal quality of the uplink signals to the threshold value for signal quality.

Example 15: The method of any one of the preceding examples, wherein the determining to regroup the user equipment from the source user equipment-coordination set to the target user equipment-coordination set further comprises the base station:

receiving a message from the coordinating user equipment of the source user equipment-coordination set indicating that a signal quality of communication with the user equipment over a local wireless network has dropped below a signal quality threshold for local wireless communication in the source user equipment-coordination set.

Example 16: The method of any one of the preceding examples, wherein the determining to regroup the user equipment from the source user equipment-coordination set to the target user equipment-coordination set further comprises the base station:

determining a timing of the regrouping of the user equipment from the source user equipment-coordination set to the target user equipment-coordination set; and including an indication of the timing of the regrouping in the release message to the coordinating user equipment of the source user equipment-coordination set, in the request message to the coordinating user equipment of the target user equipment-coordination set, and in the regrouping message to the user equipment.

Example 17: The method of example 16, wherein the indication of the timing of the regrouping directs the user equipment to release from the source user equipment-coordination set before joining the target user equipment-coordination set.

Example 18: The method of example 16 or 17, wherein the indication of the timing of the regrouping directs the user equipment to join the target user equipment-coordination set before releasing from the source user equipment-coordination set.

Example 19: The method of example 18, the method further comprising the base station:

determining a time-division multiplexing pattern for the user equipment to perform joint reception or joint transmission with the source user equipment-coordination set and the target user equipment-coordination set; and including the time-division multiplexing pattern in the release message to the coordinating user equipment of the source user equipment-coordination set, in the request message to the coordinating user equipment of the target user equipment-coordination set, and in the regrouping message to the user equipment.

Example 20: The method of example 19, wherein the including the time-division multiplexing pattern in the release message to the coordinating user equipment of the source user equipment-coordination set enables the coordinating user equipment of the source user equipment-coordination set to schedule joint communications for the source user equipment-coordination set that includes or excludes the user equipment in the joint communications of the source user equipment-coordination set.

Example 21: The method of example 19 or 20, wherein the including the time-division multiplexing pattern in the request message to the coordinating user equipment of the target user equipment-coordination set enables the coordinating user equipment of the source target to schedule joint communications for the target user equipment-coordination set that includes or excludes the user equipment in the joint communications of the target user equipment-coordination set.

Example 22: The method of any one of examples 19 to 21, wherein the determining the timing of the regrouping of the user equipment from the source user equipment-coordination set to the target user equipment-coordination set further comprises the base station:

determining another timing for the release of the user equipment from the source user equipment-coordination set after joining the target user equipment-coordination set; and including the other indication of the timing of the release of the user equipment from the source user equipment-coordination set in the release message to the coordinating user equipment of the source user equipment-coordination set, in the request message to the coordinating user equipment of the target user equipment-coordination set, and in the regrouping message to the user equipment, the including being effective to direct the user equipment to release from the source user equipment-coordination set at the other indicated timing.

Example 23: The method of any one of the preceding examples, wherein the release message is a layer-2 or a layer 3 message.

Example 24: The method of any one of the preceding examples, wherein the request message is a layer-2 or a layer 3 message.

Example 25: The method of any one of the preceding examples, wherein the regrouping message is a layer-2 or a layer 3 message.

Example 26: The method of any one of the preceding examples, wherein a first radio frequency used by the source user equipment-coordination set for joint-communication with the base station is different than a second radio frequency used by the target user equipment-coordination set for joint-communication with the base station, wherein the regrouping message includes an indication of the second radio frequency used by the target user equipment-coordination set for joint-communication with the base station, and wherein transmitting the regrouping message to the user equipment is effective to direct the user equipment to change from the first radio frequency to the second radio frequency for communication with the base station.

Example 27: A base station comprising:

a wireless transceiver;

a processor; and memory comprising instructions for a base station manager application that are executable by the processor to configure the base station to perform any method of examples 1 to 26.

Example 28: A method performed by a user equipment configured as a coordinating user equipment for a source user equipment-coordination set in a wireless communications network, the method comprising the coordinating user equipment:

receiving, from a base station, a release message for a regrouping of a user equipment in the source user equipment-coordination set;

forwarding information related to the user equipment to a coordinating user equipment of a target user equipment-coordination set for the regrouping; and in response to successfully forwarding the information, transmitting another release message to the user equipment that is effective to direct the user equipment to release from the source user equipment-coordination set.

Example 29: The method of example 28, wherein the forwarding the information related to the user equipment to the coordinating user equipment of the target user equipment-coordination set comprises the coordinating user equipment:

forwarding the information related to the user equipment to the coordinating user equipment of the target user equipment-coordination set using a local wireless network.

Example 30: The method of example 28 or 29, wherein the forwarding the information related to the user equipment to the coordinating user equipment of the target user equipment-coordination set comprises the coordinating user equipment:

transmitting the information related to the user equipment to the base station, the transmitting being effective to direct the base station to forward the information related to the user equipment to the coordinating user equipment of the target user equipment-coordination set.

Example 31: The method of any one of examples 28 to 30, wherein the release message for the regrouping of the user equipment in the source user equipment-coordination set includes an indication of a timing for the release of the user equipment from the source user equipment-coordination set, the method further comprises the coordinating user equipment:

including the indication of the timing of the release in the other release message transmitted to the user equipment.

Example 32: The method of any one of examples 28 to 31, wherein the release message for the regrouping of the user equipment in the source user equipment-coordination set includes a time-division multiplexing pattern for the user equipment to perform joint communications with the source user equipment-coordination set and the target user equipment-coordination set, the method further comprising the coordinating user equipment:

using the time-division multiplexing pattern to schedule joint communications for the source user equipment-coordination set that includes or excludes the user equipment in the joint communications of the source user equipment-coordination set.

Example 33: The method of any one of examples 28 to 32, further comprising:

in response to forwarding the information, receiving an acknowledgement from the coordinating user equipment of the target user equipment-coordination set.

Example 34: The method of any one of examples 28 to 33, wherein the release message is a layer-2 or a layer 3 message.

Example 35: A method performed by a user equipment configured as a coordinating user equipment for a target user equipment-coordination set in a wireless communications network, the method comprising the coordinating user equipment:

receiving, from a base station, a request message for a regrouping of the user equipment to the target user equipment-coordination set;

receiving information related to the user equipment from a coordinating user equipment of a source user equipment-coordination set for the regrouping; and in response to receiving the request message, transmitting another request message to the user equipment that is effective to direct the user equipment to join from the target user equipment-coordination set.

Example 36: The method of example 35, wherein the receiving the information related to the user equipment from the coordinating user equipment of the source user equipment-coordination set comprises the coordinating user equipment:
  receiving the information related to the user equipment from the coordinating user equipment of the source user equipment-coordination set using a local wireless network.
Example 37: The method of example 35 or 36, wherein the receiving the information related to the user equipment from the coordinating user equipment of the source user equipment-coordination set comprises the coordinating user equipment:
  receiving the information related to the user equipment from the base station.
Example 38: The method of any one of examples 35 to 37, wherein the request message for the regrouping of the user equipment in the source user equipment-coordination set includes an indication of a timing for the regrouping of the user equipment from the source user equipment-coordination set, the method further comprises the coordinating user equipment:
  including the indication of the timing of the release in the other request message transmitted to the user equipment.
Example 39: The method of any one of examples 35 to 38, wherein the request message for the regrouping of the user equipment includes a time-division multiplexing pattern for the user equipment to perform joint communications with the source user equipment-coordination set and the target user equipment-coordination set, the method further comprising the coordinating user equipment:
  using the time-division multiplexing pattern to schedule joint communications for the target user equipment-coordination set that includes or excludes the user equipment in the joint communications of the target user equipment-coordination set.
Example 40: The method of any one of examples 35 to 39, further comprising:
  in response to receiving the information, transmitting an acknowledgement to the coordinating user equipment of the source user equipment-coordination set.
Example 41: The method of any one of examples 35 to 40, wherein the request message is a layer-2 or a layer 3 message.
Example 42: A user equipment comprising:
  a wireless transceiver;
  a local wireless network transceiver;
  a processor; and
  instructions for a communication manager application that are executable by the processor to configure the user equipment to perform any method of examples 28 to 41.
Example 43: A system, comprising:
  at least one base station;
  at least one source user equipment-coordination set;
  at least one target user equipment-coordination set; and
  a user equipment being part of the at least one source user equipment-coordination set;
  wherein the system is configured to regroup the user equipment between the source user equipment coordination set and the target user equipment-coordination set by:
    determining to regroup the user equipment from a source user equipment-coordination set to a target user equipment-coordination set;
    transmitting a release message to a coordinating user equipment of the source user equipment-coordination set requesting the coordinating user equipment of the source user equipment-coordination set to release the user equipment from the source user equipment-coordination set;
    transmitting a request message to a coordinating user equipment of the target user equipment-coordination set requesting the coordinating user equipment of the target user equipment-coordination set to add the user equipment to the target user equipment-coordination set; and
    transmitting a regrouping message to the user equipment that is effective to direct the user equipment to perform a regrouping from the source user equipment-coordination set to the target user equipment-coordination set.

Although aspects of a UE-coordination-set regrouping have been described in language specific to features and/or methods, the subject of the appended claims is not necessarily limited to the specific features or methods described. Rather, the specific features and methods are disclosed as example implementations of the UE-coordination-set regrouping, and other equivalent features and methods are intended to be within the scope of the appended claims. Further, various different aspects are described, and it is to be appreciated that each described aspect can be implemented independently or in connection with one or more other described aspects.

The invention claimed is:

1. A method to regroup a user equipment between user equipment coordination sets, the method comprising a base station:
  transmitting a release message, to a coordinating user equipment of a source user equipment-coordination set, requesting the coordinating user equipment of the source user equipment-coordination set to release the user equipment from the source user equipment-coordination set;
  transmitting a request message, to a coordinating user equipment of a target user equipment-coordination set, requesting the coordinating user equipment of the target user equipment-coordination set to add the user equipment to the target user equipment-coordination set;
  transmitting a regrouping message to the user equipment that is effective to direct the user equipment to perform a regrouping from the source user equipment-coordination set to the target user equipment-coordination set, the source user equipment-coordination set configured to:
    jointly-receive a downlink signal, corresponding to the regrouping message, from the base station;
    demodulate and sample the downlink signal; and
    forward samples of the downlink signal to the coordinating user equipment of the source user equipment-coordination set for joint processing of the samples with samples of the downlink signal received by one or more other user equipments in the source user equipment-coordination set.

2. The method of claim 1, wherein the transmitting the release message to the coordinating user equipment of the source user equipment-coordination set is effective to direct the coordinating user equipment of the source user equipment-coordination set to forward information related to the user equipment to the coordinating user equipment of the target user equipment-coordination set.

3. The method of claim 2, the method further comprising the base station:
  receiving the information related to the user equipment from the coordinating user equipment of the source user equipment-coordination set; and forwarding the information related to the user equipment to the coordinating user equipment of the target user equipment-coordination set.

4. The method of claim 2, wherein information related to the user equipment includes one or more of: an identity of the coordinating user equipment of the target user equipment-coordination set, timing information usable to synchronize and communicate with the coordinating user equipment of the target user equipment-coordination set, or frequency information usable to synchronize and communicate with the coordinating user equipment of the target user equipment-coordination set.

5. The method claim 1, wherein the transmitting the request message to the coordinating user equipment of the target user equipment-coordination set is effective to direct the coordinating user equipment of the target user equipment-coordination set to transmit another request message to the user equipment to direct the user equipment to join the target user equipment-coordination set, and wherein the transmission of the other request message to the user equipment is effective to enable the user equipment within the target user equipment-coordination set to:
  demodulate and sample the downlink signal, corresponding to the other request message, from the base station; and
  forward the samples of the downlink signal to the coordinating user equipment of the target user equipment-coordination set for joint processing of the samples with samples of the downlink signal received by one or more other user equipments in the target user equipment-coordination set.

6. The method of claim 1 further comprising, determining to regroup the user equipment from the source user equipment-coordination set to the target user equipment-coordination set by:
  determining that a geographic location of the user equipment has exceeded a threshold distance from the coordinating user equipment of the source user equipment-coordination set;
  determining that a geographic location of the user equipment is less than a threshold distance from the coordinating user equipment of the target user equipment-coordination set;
  determining that a radio frequency signal quality for signals to or from the user equipment has dropped below a threshold value for signal quality; or
  receiving a message, from the coordinating user equipment of the source user equipment-coordination set, indicating that a signal quality of communication with the user equipment over a local wireless network has dropped below a signal quality threshold for local wireless communication in the source user equipment-coordination set.

7. The method of claim 1, wherein a first radio frequency used by the source user equipment-coordination set for joint-communication with the base station is different than a second radio frequency used by the target user equipment-coordination set for joint-communication with the base station, wherein the regrouping message includes an indication of the second radio frequency used by the target user equipment-coordination set for joint-communication with the base station, and wherein transmitting the regrouping message to the user equipment is effective to direct the user equipment to change from the first radio frequency to the second radio frequency for communication with the base station.

8. The method of claim 1 further comprising, determining to regroup the user equipment from the source user equipment-coordination set to the target user equipment-coordination set further by:
  determining a timing of the regrouping of the user equipment from the source user equipment-coordination set to the target user equipment-coordination set; and
  including an indication of the timing of the regrouping in the release message to the coordinating user equipment of the source user equipment-coordination set, in the request message to the coordinating user equipment of the target user equipment-coordination set, and in the regrouping message to the user equipment.

9. The method of claim 8, wherein the indication of the timing of the regrouping directs the user equipment to release from the source user equipment-coordination set before joining the target user equipment-coordination set, and wherein the indication of the timing of the regrouping directs the user equipment to join the target user equipment-coordination set before releasing from the source user equipment-coordination set.

10. The method of claim 9, the method further comprising the base station:
  determining a time-division multiplexing pattern for the user equipment to perform joint reception or joint transmission with the source user equipment-coordination set and the target user equipment-coordination set; and
  including the time-division multiplexing pattern in the release message to the coordinating user equipment of the source user equipment-coordination set, in the request message to the coordinating user equipment of the target user equipment-coordination set, and in the regrouping message to the user equipment.

11. The method of claim 10, wherein the including the time-division multiplexing pattern in the release message to the coordinating user equipment of the source user equipment-coordination set enables the coordinating user equipment of the source user equipment-coordination set to schedule joint communications for the source user equipment-coordination set that includes or excludes the user equipment in the joint communications of the source user equipment-coordination set.

12. The method of claim 10, wherein the including the time-division multiplexing pattern in the request message to the coordinating user equipment of the target user equipment-coordination set enables the coordinating user equipment of the source user equipment-coordination set to schedule joint communications for the target user equipment-coordination set that includes or excludes the user equipment in the joint communications of the target user equipment-coordination set.

13. The method of claim 8, wherein the determining the timing of the regrouping of the user equipment from the source user equipment-coordination set to the target user equipment-coordination set further comprises the base station:
  determining another timing for the release of the user equipment from the source user equipment-coordination set after joining the target user equipment-coordination set; and
  including the other indication of the timing of the release of the user equipment from the source user equipment-coordination set in the release message to the coordinating user equipment of the source user equipment-coordination set, in the request message to the coordinating user equipment of the target user equipment-coordination set, and in the regrouping message to the user equipment, the including being effective to direct the user equipment to release from the source user equipment-coordination set at the other indicated timing.

14. A method performed by a user equipment configured as a coordinating user equipment for a source user equipment-coordination set in a wireless communications network, the method comprising the coordinating user equipment:
   jointly-receiving, with other user equipments in the source user equipment-coordination set and from a base station, a release message for a regrouping of a user equipment in the source user equipment-coordination set;
   forwarding information related to the user equipment, to a coordinating user equipment of a target user equipment-coordination set, for the regrouping; and
   in response to successfully forwarding the information, transmitting another release message, to the user equipment, that is effective to direct the user equipment to release from the source user equipment-coordination set.

15. The method of claim 14, wherein the forwarding the information related to the user equipment to the coordinating user equipment of the target user equipment-coordination set comprises the coordinating user equipment:
   forwarding the information related to the user equipment to the coordinating user equipment of the target user equipment-coordination set using a local wireless network.

16. The method of claim 14, wherein the forwarding the information related to the user equipment to the coordinating user equipment of the target user equipment-coordination set comprises the coordinating user equipment:
   transmitting the information related to the user equipment to the base station, the transmitting being effective to direct the base station to forward the information related to the user equipment to the coordinating user equipment of the target user equipment-coordination set.

17. A method performed by a user equipment configured as a coordinating user equipment for a target user equipment-coordination set in a wireless communications network, the method comprising the coordinating user equipment:
   jointly-receiving, with other user equipments in the target user equipment-coordination set and from a base station, a request message for a regrouping of the user equipment to the target user equipment-coordination set;
   receiving information related to the user equipment, from a coordinating user equipment of a source user equipment-coordination set, for the regrouping; and
   in response to receiving the request message, transmitting another request message, to the user equipment, that is effective to direct the user equipment to join from the target user equipment-coordination set.

18. The method of claim 17, wherein the receiving the information related to the user equipment from the coordinating user equipment of the source user equipment-coordination set comprises the coordinating user equipment:
   receiving the information related to the user equipment from the coordinating user equipment of the source user equipment-coordination set using a local wireless network.

19. The method of claim 17, wherein the receiving the information related to the user equipment from the coordinating user equipment of the source user equipment-coordination set comprises the coordinating user equipment:
   receiving the information related to the user equipment from the base station.

* * * * *